(12) United States Patent
Yokoyama et al.

(10) Patent No.: US 10,177,373 B2
(45) Date of Patent: Jan. 8, 2019

(54) POSITIVE ELECTRODE ACTIVE MATERIAL FOR NON-AQUEOUS ELECTROLYTE SECONDARY BATTERY AND METHOD FOR PRODUCING SAME, AND NON-AQUEOUS ELECTROLYTE SECONDARY BATTERY MANUFACTURED USING SAID POSITIVE ELECTRODE ACTIVE MATERIAL

(71) Applicant: SUMITOMO METAL MINING CO., LTD., Tokyo (JP)

(72) Inventors: Jun Yokoyama, Niihama (JP); Yuki Furuichi, Niihama (JP); Tomoko Nakayama, Niihama (JP); Tetsufumi Komukai, Niihama (JP); Kensaku Mori, Niihama (JP); Mitsuru Yamauchi, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 15/306,206

(22) PCT Filed: Apr. 20, 2015

(86) PCT No.: PCT/JP2015/061958
§ 371 (c)(1),
(2) Date: Oct. 24, 2016

(87) PCT Pub. No.: WO2015/163273
PCT Pub. Date: Oct. 29, 2015

(65) Prior Publication Data
US 2017/0054147 A1 Feb. 23, 2017

(30) Foreign Application Priority Data

Apr. 25, 2014 (JP) ................. 2014-091355
Feb. 24, 2015 (JP) ................. 2015-034268

(51) Int. Cl.
| | |
|---|---|
| H01M 4/36 | (2006.01) |
| H01M 4/505 | (2010.01) |
| H01M 4/525 | (2010.01) |
| H01M 4/04 | (2006.01) |
| H01M 4/38 | (2006.01) |
| H01M 4/485 | (2010.01) |
| C01G 53/00 | (2006.01) |
| H01M 4/02 | (2006.01) |

(52) U.S. Cl.
CPC ......... *H01M 4/366* (2013.01); *H01M 4/0471* (2013.01); *H01M 4/36* (2013.01); *H01M 4/382* (2013.01); *H01M 4/485* (2013.01); *H01M 4/505* (2013.01); *H01M 4/525* (2013.01); *C01G 53/00* (2013.01); *H01M 2004/028* (2013.01)

(58) Field of Classification Search
CPC ...... C01G 53/42; H01M 4/0471; H01M 4/36; H01M 4/364; H01M 4/366; H01M 4/382; H01M 4/485; H01M 4/505; H01M 4/525
USPC ............. 252/519.15, 519.12, 520.21, 520.5
See application file for complete search history.

(56) References Cited

U.S. PATENT DOCUMENTS

| | | | |
|---|---|---|---|
| 9,130,212 B1 * | 9/2015 | Kokado | ................ B82Y 30/00 |
| 9,406,928 B2 * | 8/2016 | Kokado | ................ B82Y 30/00 |
| 2009/0239150 A1 * | 9/2009 | Okada | ................... H01M 4/131 |
| | | | 429/231.3 |
| 2017/0098821 A1 * | 4/2017 | Kokado | ................ H01M 4/525 |
| 2017/0352885 A1 * | 12/2017 | Kondo | ................. H01M 4/525 |

FOREIGN PATENT DOCUMENTS

| | | | | |
|---|---|---|---|---|
| EP | 2624342 B1 * | 11/2016 | ............ | B82Y 30/00 |
| JP | 2008034369 A * | 2/2008 | | |
| JP | 2012079464 A * | 4/2012 | ............ | B82Y 30/00 |
| JP | 2013152866 A * | 8/2013 | | |
| WO | WO-2012043783 A1 * | 4/2012 | ............ | B82Y 30/00 |

* cited by examiner

*Primary Examiner* — Douglas J McGinty
(74) *Attorney, Agent, or Firm* — Kratz, Quintos & Hanson, LLP

(57) ABSTRACT

A positive electrode active material for a non-aqueous electrolyte secondary battery, including primary particles of a lithium nickel composite oxide represented by the formula: $Li_bNi_{1-x-y}Co_xM_yO_2$ wherein M represents at least one element selected from Mg, Al, Ca, Ti, V, Cr, Mn, Nb, Zr and Mo; b represents a number satisfying $0.95 \leq b \leq 1.03$; and x represents a number satisfying $0 < x \leq 0.15$ and y represents a number satisfying $0 < y \leq 0.07$, wherein the sum total of x and y is 0.16 or smaller, i.e., $x+y \leq 0.16$) and secondary particles that are aggregates of the primary particles, wherein microparticles containing W and Li are present on the surface of each of the primary particles, and the length of axis-c of the lithium nickel composite oxide is 14.183 angstroms or more as determined by a Rietveld analysis of X-ray diffraction data on the oxide.

15 Claims, 2 Drawing Sheets

F I G. 2
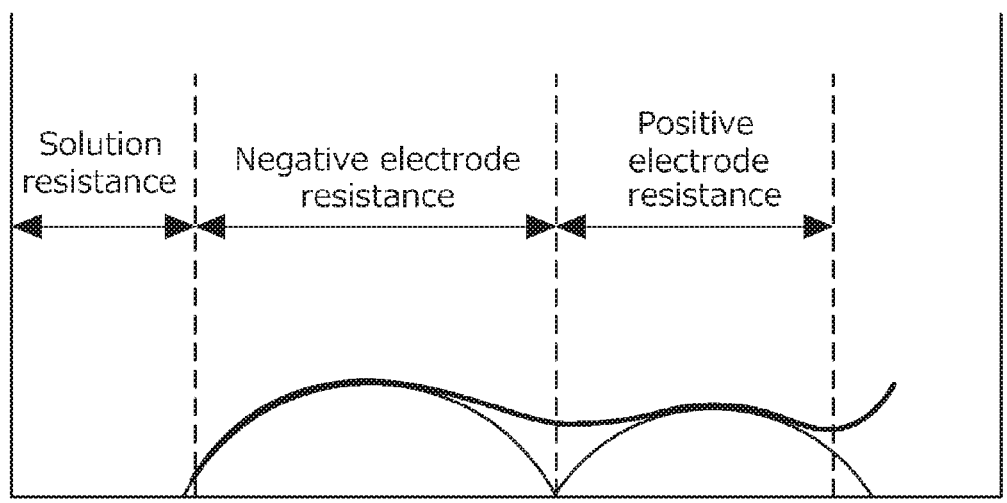
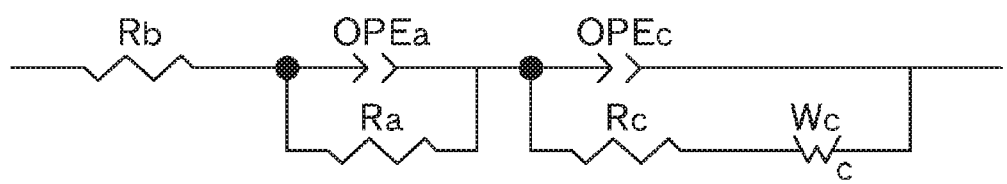

POSITIVE ELECTRODE ACTIVE MATERIAL FOR NON-AQUEOUS ELECTROLYTE SECONDARY BATTERY AND METHOD FOR PRODUCING SAME, AND NON-AQUEOUS ELECTROLYTE SECONDARY BATTERY MANUFACTURED USING SAID POSITIVE ELECTRODE ACTIVE MATERIAL

TECHNICAL FIELD

The present invention relates to a positive electrode active material for a non-aqueous electrolyte secondary battery and a method for producing the same, and a non-aqueous electrolyte secondary battery in which the positive electrode active material is used.

BACKGROUND ART

In recent years, with the rapid spread of small electronics such as a mobile telephone and a notebook-sized personal computer, demand for a non-aqueous electrolyte secondary battery which is used as a chargeable and dischargeable power supply has been rapidly increased.

As a positive electrode active material for a non-aqueous electrolyte secondary battery, a lithium-nickel composite oxide represented by lithium nickel dioxide ($LiNiO_2$), lithium-manganese composite oxide represented by lithium manganese dioxide ($LiMnO_2$) and the like have been widely used as well as lithium-cobalt composite oxide represented by lithium cobalt dioxide ($LiCoO_2$).

However, there are some defects in the lithium cobalt dioxide, such that the lithium cobalt dioxide is expensive because its reserve in the earth is a little, and that the lithium cobalt dioxide contains cobalt which is unstable in supply and has a highly fluctuating price range as a major component. Therefore, there have been remarked a lithium-nickel composite oxide containing relatively inexpensive nickel as a major component and lithium-manganese composite oxide containing relatively inexpensive manganese as a major component from the viewpoint of reduction in cost.

The lithium manganese dioxide is superior in thermal stability to lithium cobalt dioxide. However, the lithium manganese dioxide has some problems in practical use in a battery, because its charge and discharge capacity is much smaller than that of the other materials, and its charge and discharge cycle characteristic showing life of a battery is also much shorter than the other materials. On the other hand, since the lithium nickel dioxide has a charge and discharge capacity greater than the lithium cobalt dioxide, the lithium nickel dioxide has been expected to be used as a positive electrode active material which enables to produce an inexpensive battery having a high energy density.

This lithium nickel oxide has been usually prepared by mixing a lithium compound with a nickel compound such as nickel hydroxide or nickel oxyhydroxide, and calcining the resulting mixture. The form of the lithium nickel oxide is a powder in which primary particles are mono-dispersed, or a powder of secondary particles formed by aggregation of primary particles, and having spaces between the primary particles. However, both powders have some defects such that the powders are inferior in thermal stability under the condition of charging to the lithium cobalt dioxide.

In other words, since pure lithium nickel dioxide has defects in thermal stability, charge and discharge cycle characteristics and the like, the lithium nickel dioxide cannot be used in a practical battery. This is based on that the lithium nickel dioxide is inferior in stability of a crystal structure under a charging condition to the lithium cobalt dioxide.

Therefore, in order to stabilize a crystal structure under the condition that lithium is eliminated from the crystal structure in a charging process, and to obtain a lithium-nickel composite oxide having favorable thermal stability and charge and discharge cycle characteristics as a positive electrode active material, there has been generally carried out replacement of a part of nickel contained in the lithium-nickel composite oxide with other element.

For example, Patent Literature 1 proposes a non-aqueous battery in which a compound represented by the formula: $Li_aM_bNi_cCo_dO_e$ in which M is at least one metal selected from the group consisting of Al, Mn, Sn, In, Fe, V, Cu, Mg, Ti, Zn and Mo, $0<a<1.3$, $0.02 \le b \le 0.5$, $0.02 \le d/c+d \le 0.9$, $1.8<e<2.2$ and $b+c+d=1$ is used as a positive electrode active material.

In addition, as a process for improving thermal stability of the lithium-nickel composite oxide, a process for washing lithium nickel dioxide with water after calcining has been developed.

For example, Patent Literature 2 proposes a process for producing a positive electrode active material for a non-aqueous electrolyte secondary battery, which includes calcining nickel hydroxide or nickel oxyhydroxide at a temperature of 600° C. to 1100° C. in the air to prepare nickel oxide, mixing the resulting nickel oxide with a lithium compound, subsequently calcining the resulting mixture in an oxygen atmosphere at a maximum temperature of 650° C. to 850° C., washing the resulting calcined powder with water within a period of time which satisfies the relation of $A \le B/40$ in which A is a period of time for washing with water of which unit is minute, and B is a concentration of slurry of the calcined powder of which unit is g/L, and thereafter carrying out filtration and drying of the calcined powder.

However, when a part of nickel included in the lithium-nickel composite oxide is substituted with other element in a large amount (in other words, under a condition of a lower content of nickel), although thermal stability of the lithium-nickel composite oxide is improved, battery capacity is lowered. On the other hand, when a part of nickel included in the lithium-nickel composite oxide is substituted with other element in a small amount (in other words, under a condition of a higher content of nickel) in order to prevent lowering in battery capacity, thermal stability of the lithium-nickel composite oxide cannot be sufficiently improved. Moreover, when the content of nickel is increased, there also arise some problems such that cation mixing easily occurs in calcining, and therefore synthesis of the lithium-nickel composite oxide becomes difficult.

In addition, when lithium nickelate which is washed with water after calcining is used in a non-aqueous electrolyte secondary battery, it is thought that a positive electrode active material having high electric capacity and being excellent in thermal stability and storage characteristics in an environment having high temperatures can be obtained. However, a positive electrode active material which satisfies requirements for high electric capacity and high output has not yet been obtained.

On the other hand, in order to improve output characteristics, a method for adding a tungsten compound to a lithium-nickel composite oxide has been examined.

For example, Patent Literature 3 proposes a positive electrode active material for a non-aqueous electrolyte secondary battery containing a lithium metal composite oxide powder including a primary particle represented by the general formula: $Li_zNi_{1-x-y}Co_xM_yO_2$ in which $0.10 \leq x \leq 0.35$, $0 \leq y \leq 0.35$, $0.97 \leq z \leq 1.20$, and M is at least one element selected from Mn, V, Mg, Mo, Nb, Ti and Al, and a secondary particle including an aggregate of the primary particles, in which the surface of the primary particle has a fine particle containing W and Li.

Although the positive electrode active material is improved in output characteristics, the content of nickel in the positive electrode active material is low. Therefore, increase of an electric capacity has been desired for the positive electrode active material. In addition, when the content of nickel in the positive electrode active material is increased, there is a necessity to examine thermal stability of the positive electrode active material.

As mentioned above, although various lithium-nickel composite oxides in which a part of nickel is substituted with other element have been developed, a positive electrode active material made of the lithium-nickel composite oxide which can sufficiently respond to the requirements for high electric capacity and high output when used in a non-aqueous electrolyte secondary battery has not yet been produced.

PRIOR ART LITERATURES

Patent Literatures

Patent Literature 1: Japanese Patent Unexamined Publication No. Hei. 05-242891

Patent Literature 2: Japanese Patent Unexamined Publication No. 2007-273108

Patent Literature 3: Japanese Patent Unexamined Publication No. 2012-079464

SUMMARY OF THE INVENTION

Problems to be Solved by the Invention

The present invention has been made in view of the above-mentioned problems. An object of the present invention to provide a positive electrode active material for a non-aqueous electrolyte secondary battery, which can achieve both high electric capacity and high output at a time when the positive electrode active material is used in a positive electrode material, and a non-aqueous electrolyte secondary battery having high electric capacity, high output and high safety, in which this positive electrode active material is used.

In addition, another object of the present invention is to provide a method for producing a positive electrode active material which can be easily produced in an industrial scale.

Means for Solving Problems

The present inventors have been earnestly studied powder characteristics of lithium metal composite oxide which is used as a positive electrode active material for a non-aqueous electrolyte secondary battery, and influences of the lithium metal composite oxide to a positive electrode resistance of a battery in order to solve the above-mentioned problems. As a result, the present inventors have found out that both high electric capacity and high output can be achieved at a time by controlling a crystal structure of a lithium-nickel composite oxide in which a content of nickel is increased, and forming a fine particle including W and Li on the surface of a primary particle of the lithium-nickel composite oxide.

Furthermore, the present inventors have found out that the above-mentioned crystal structure and formation of a fine particle containing W and Li can be achieved by a step for mixing a nickel compound with a lithium compound, and thereafter controlling a calcination temperature of the resulting mixture to a specific temperature, and a step for adding a tungsten compound containing lithium to the lithium-nickel composite oxide under a wet condition, and carrying out heat-treating of the resulting mixture. Thus, the present invention has been eventually accomplished.

The positive electrode active material for a non-aqueous electrolyte secondary battery according to the first aspect of the present invention is a positive electrode active material for a non-aqueous electrolyte secondary battery, including a primary particle of a lithium-nickel composite oxide represented by the following general formula (1), and a secondary particle including an aggregate of the primary particles, wherein the primary particle has a fine particle containing W and Li on its surface, and the length of c-axis of the crystal of the lithium-nickel composite oxide is 14.183 angstrom or more as determined by a Rietveld analysis of X-ray diffraction, (Chem. 1)

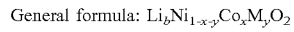

General formula: $Li_bNi_{1-x-y}Co_xM_yO_2$ (1)

wherein M is at least one element selected from Mg, Al, Ca, Ti, V, Cr, Mn, Nb, Zr and Mo, b is a numeral satisfying $0.95 \leq b \leq 1.03$, x is a numeral satisfying $0 < x \leq 0.15$, y is a numeral satisfying $0 < y \leq 0.07$, and the sum of x+y is a numeral satisfying $x+y \leq 0.16$.

The positive electrode active material for a non-aqueous electrolyte secondary battery according to the second aspect of the present invention is characterized in that a porosity of the secondary particle in which the fine particle containing tungsten and lithium is incorporated in a space is 0.5% to 4% as determined by observing the cross-section of the secondary particle in the first aspect of the invention.

The positive electrode active material for a non-aqueous electrolyte secondary battery according to the third aspect of the present invention is characterized in that the number of tungsten atom included in the fine particle containing W and Li is 0.1 atom % to 3.0 atom % based on the sum of the numbers of Ni, Co and M atoms included in the lithium-nickel composite oxide of the primary particle in the first or second aspect of the present invention.

The positive electrode active material for a non-aqueous electrolyte secondary battery according to the fourth aspect of the present invention is characterized in that the positive electrode active material is represented by the following general formula (2):

(Chem. 2)

General formula: $Li_bNi_{1-x-y}Co_xM_yW_zO_{2+\alpha}$ (2)

wherein M is at least one element selected from Mg, Al, Ca, Ti, V, Cr, Mn, Nb, Zr and Mo, b is a numeral satisfying $0.95 < b \leq 1.10$, x is a numeral satisfying $0 < x \leq 0.15$, y is a numeral satisfying $0 < y \leq 0.07$, the sum of x+y is a numeral satisfying $x+y \leq 0.16$, z is a numeral satisfying $0.001 \leq z \leq 0.03$, and $\alpha$ is a numeral satisfying $0 \leq \alpha \leq 0.2$ in the second aspect of the present invention.

The positive electrode active material for a non-aqueous electrolyte secondary battery according to the fifth aspect of the present invention is characterized in that W and Li contained in the fine particle exists in the form of lithium tungstate in any one of the first to fourth aspects of the present invention.

The positive electrode active material for a non-aqueous electrolyte secondary battery according to the sixth aspect of the present invention is characterized in that the lithium-nickel composite oxide has an average particle diameter of 8 μm to 20 μm in any one of the first to fifth aspects of the present invention.

A method for producing a positive electrode active material for a non-aqueous electrolyte secondary battery according to the seventh aspect of the present invention is a method for producing a positive electrode active material for a non-aqueous electrolyte secondary battery including a lithium-nickel composite oxide, characterized in that the method includes the following steps (A) to (D) in the order of steps (A) to (D):

(A) a step for mixing a nickel compound containing nickel, cobalt, and at least one member selected from Mg, Al, Ca, Ti, V, Cr, Mn, Nb, Zr and Mo with a lithium compound, and then calcining the resulting mixture at a temperature of 700° C. to 780° C. in an oxidizing atmosphere, to preparing a calcined powder of the lithium-nickel composite oxide represented by the following general formula (3), which includes a primary particle and a secondary particle including an aggregate of the primary particles, in which the length of the c-axis of the crystal of the lithium-nickel composite oxide is 14.183 angstrom or more as determined by a Rietveld analysis of X-ray diffraction.

(Chem. 3)

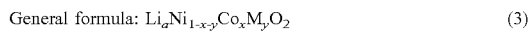

General formula: $Li_aNi_{1-x-y}Co_xM_yO_2$ (3)

wherein M is at least one element selected from Mg, Al, Ca, Ti, V, Cr, Mn, Nb, Zr and Mo, a is a numeral satisfying 0.98≤a≤1.11, x is a numeral satisfying 0<x≤0.15, y is a numeral satisfying 0<y≤0.07, and the sum of x+y is a numeral satisfying x+y≤0.16;

(B) a step for mixing the calcined powder of the lithium-nickel composite oxide prepared in the step (A) with water so that the amount of the calcined powder of the lithium-nickel composite oxide is 700 g to 2000 g based on 1 liter of water, to form slurry, and washing the calcined powder of the lithium-nickel composite oxide in the form of the slurry with water;

(C) a step for adding a tungsten compound to the calcined powder of the lithium-nickel composite oxide during washing with water in the step (B) or after washing with water, and dispersing W on the surface of the primary particle of the calcined powder of the lithium-nickel composite oxide; and (D) a step for heat-treating the calcined powder produced in the step (C) in which W is dispersed on the surface of the primary particle, to form a fine particle containing W and Li on the surface of the primary particle of the calcined powder of the lithium-nickel composite oxide.

The method for producing a positive electrode active material for a non-aqueous electrolyte secondary battery according to the eighth aspect of the present invention is characterized in that the amount of tungsten dispersed on the surface of the primary particle of the lithium-nickel composite oxide is controlled to 0.1 atom % to 3.0 atom % based on the sum of the numbers of Ni, Co and M atoms which are included in the lithium-nickel composite oxide in the seventh aspect of the present invention.

The method for producing a positive electrode active material for a non-aqueous electrolyte secondary battery according to a ninth aspect of the present invention is characterized in that the heat treatment in the step (D) is carried out at 100° C. to 600° C. in an oxygen atmosphere or an atmosphere having a reduced pressure in the seventh or eighth aspect of the present invention.

The method for producing a positive electrode active material for a non-aqueous electrolyte secondary battery according to a tenth aspect of the present invention is characterized in that the nickel compound is any one of a nickel composite hydroxide, a nickel composite oxyhydroxide obtained by oxidizing the nickel composite hydroxide with an oxidizing agent, a nickel composite oxide obtained by oxidizing and calcining the nickel composite oxyhydroxide at a temperature of 500° C. to 750° C., a nickel composite oxide obtained by oxidizing and calcining the nickel composite hydroxide at a temperature of 500° C. to 750° C., and a nickel composite oxide obtained by oxidizing and calcining a mixture of the nickel composite hydroxide and the nickel composite oxyhydroxide at a temperature of 500° C. to 750° C. in any one of the seventh to ninth aspects of the present invention.

The method for producing a positive electrode active material for a non-aqueous electrolyte secondary battery according to the eleventh aspect of the present invention is characterized in that the content of sulfate radical in the nickel composite hydroxide is 0.1% to 0.4% by mass in the tenth aspect of the present invention.

The method for producing a positive electrode active material for a non-aqueous electrolyte secondary battery according to the twelfth aspect of the present invention is characterized in that the lithium compound is at least one member selected from the group consisting of lithium hydroxide, lithium oxyhydroxide, lithium oxide, lithium carbonate, lithium nitrate and a lithium halide in any one of the seventh to eleventh aspects of the present invention.

The method for producing a positive electrode active material for a non-aqueous electrolyte secondary battery according to the thirteenth aspect of the present invention is characterized in that in the step (A), the nickel compound is mixed with the lithium compound so that the molar ratio of lithium in the lithium compound to the total amount of all the metal elements in the nickel composite oxide is 0.98 to 1.11 in any one of the seventh to twelfth aspects of the present invention.

The method for producing a positive electrode active material for a non-aqueous electrolyte secondary battery according to the fourteenth aspect of the present invention is characterized in that in the step (B), the temperature of water at washing with water is controlled to 10° C. to 40° C. in any one of the seventh to thirteenth aspects of the present invention.

The non-aqueous electrolyte secondary battery according to the fifteenth aspect of the present invention is characterized in that the secondary battery has a positive electrode containing the positive electrode active material for a non-aqueous electrolyte secondary battery according to any one of the first to sixth aspects of the present invention.

Effect of the Invention

According to the first aspect of the present invention, the interlayer distance between lithium layers increases in accordance with increase of the length of c-axis. Therefore, insertion-extraction of Li from a crystal is improved. When this lithium-nickel composite oxide is used as a positive electrode active material, a positive electrode active material has high electric capacity and high output. When the primary particle has a fine particle containing W and Li on its surface, output characteristics are furthermore improved.

According to the second aspect of the present invention, since the positive electrode active material has an appropriate porosity, an electrolytic solution can be sufficiently immersed into the interior of the secondary particle, and battery capacity and output characteristics can be more improved.

According to the third aspect of the present invention, both high charge-discharge capacity and high output characteristics can be achieved at a time by adjusting the amount of tungsten to 0.1 atom % to 3.0 atom % based on the sum of the numbers of Ni, Co and M atoms included in the composite oxide particle.

According to the fourth aspect of the present invention, since the positive electrode active material contains lithium in an appropriate amount, battery capacity and output characteristics can be improved.

According to the fifth aspect of the present invention, since lithium tungstate is formed, lithium ion conductivity is furthermore increased, and a reducing effect for a reaction resistance is furthermore increased.

According to the sixth aspect of the present invention, since the lithium-nickel composite oxide particle has an appropriate average particle diameter, chargeability of a positive electrode can be increased while maintaining a battery capacity and output characteristics.

According to the seventh aspect of the present invention, since the step (A) for preparing a calcined powder, the step (B) for washing with water, the step (C) for dispersing titanium and the step (D) for forming a fine particle are carried out in this order, a positive electrode active material for a non-aqueous electrolyte secondary battery having high electric capacity and high output can be easily produced in an industrial scale. Therefore, industrial value of the positive electrode active material is remarkably high.

According to the eighth aspect of the present invention, since the amount of tungsten is 0.1 atom % to 3.0 atom % based on the sum of the numbers of Ni, Co and M atoms included in the composite oxide particle, both of high charge-discharge capacity and high output characteristics can be achieved at a time.

According to the ninth aspect of the present invention, since the fine particle containing W and Li is sufficiently formed, and the primary particle of the lithium-nickel composite oxide is not sintered, decrease in charge-discharge capacity of a battery can be suppressed.

According to the tenth aspect of the present invention, the ratio of Li to a metal other than Li in the lithium-nickel composite oxide can be stabilized. Therefore, when the lithium-nickel composite oxide is used as a positive electrode active material, electric capacity and output can be increased.

According to the eleventh aspect of the present invention, crystallinity of the lithium-nickel composite oxide is easily controlled, and the length of c-axis can be easily controlled. In addition, since shrinkage of the secondary particle due to the growth of primary particles at calcination can be appropriately regulated, a porosity of the lithium-nickel composite oxide also can be easily controlled.

According to the twelfth aspect of the present invention, there is a merit such that impurities exist little after calcination of the lithium compound.

According to the thirteenth aspect of the present invention, the composition of lithium and metal elements other than lithium in the lithium-nickel composite oxide after calcination is mostly maintained in the composition of a mixture obtained by mixing a nickel compound with a lithium compound, and the composition after washing with water can be optimized.

According to the fourteenth aspect of the present invention, impurities existing on the surface of a calcined powder of the lithium-nickel composite oxide can be removed, and the residual amount of a lithium compound such as lithium carbonate or lithium hydroxide existing on the surface can be adjusted to 0.10% by mass or less based on the total amount of the powder. Thereby, when the positive electrode active material thus obtained is used in a positive electrode of a battery, generation of gas can be suppressed when maintained at high temperatures, and all of high electric capacity, high output and high safety can be achieved at a time.

According to the fifteenth aspect of the present invention, a non-aqueous electrolyte secondary battery having high electric capacity and high safety is obtained. The secondary battery is suitable for a rechargeable secondary battery.

BRIEF EXPLANATION OF DRAWINGS

FIG. 2 is a schematic explanatory drawing of an equivalent circuit which is used in a measurement example of impedance evaluation and analysis of the impedance.

MODE FOR CARRYING OUT THE INVENTION

Figure 1:
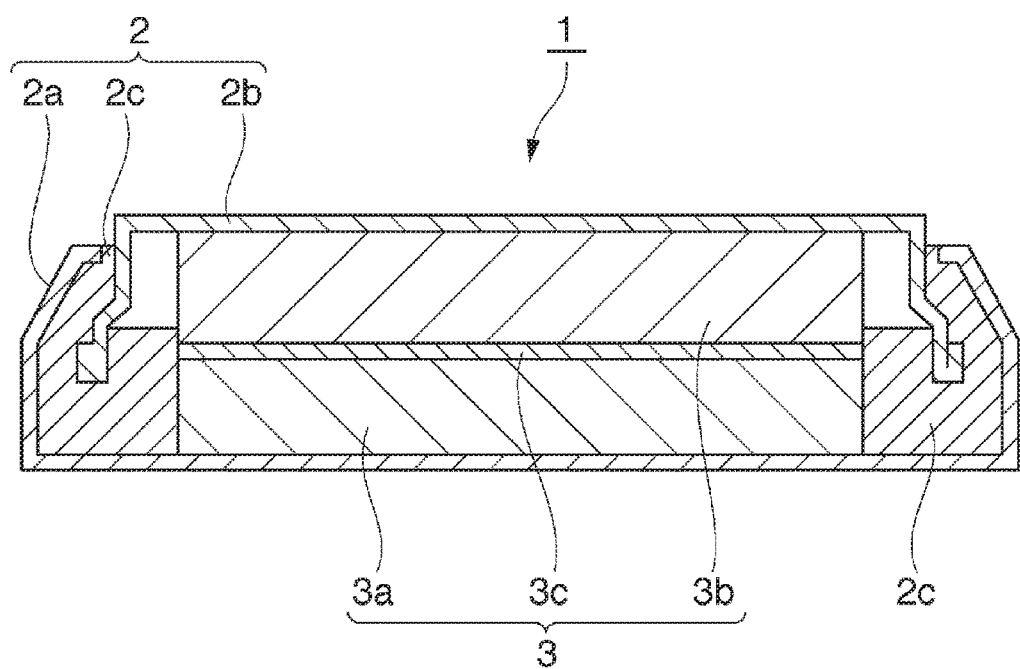
FIG. 1 is a schematic cross-sectional drawing of a coin type battery 1 which is used in evaluation of a battery.

First of all, the positive electrode active material of the present invention will be described, and thereafter, a method for producing the positive electrode active material and a non-aqueous electrolyte secondary battery in which the positive electrode active material according to the present invention is used will be described.

(1) Positive Electrode Active Material for Non-Aqueous Electrolyte Secondary Battery The positive electrode active material for a non-aqueous electrolyte secondary battery (hereinafter, simply referred to as positive electrode active material) of the present invention is a positive electrode active material which includes the primary particle of a lithium-nickel composite oxide represented by the following general formula (1) and the secondary particle including an aggregate of the primary particles, characterized in that the primary particle has a fine particle containing W and Li on its surface, and a length of c-axis of the crystal of the lithium-nickel composite oxide is 14.183 angstrom or more as determined by a Rietveld analysis of X-ray diffraction.

(Chem. 1)

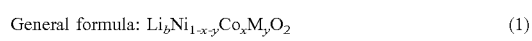

General formula: $Li_bNi_{1-x-y}Co_xM_yO_2$ (1)

wherein M is at least one element selected from Mg, Al, Ca, Ti, V, Cr, Mn, Nb, Zr and Mo, b is a numeral satisfying $0.95 \leq b \leq 1.03$, x is a numeral satisfying $0 < x \leq 0.15$, y is a numeral satisfying $0 < y \leq 0.07$, and the sum of x+y is a numeral satisfying $x+y \leq 0.16$.

Incidentally, the lithium-nickel composite oxide is a base material which forms a fine particle on the surface of the primary particle. The composite oxide particle described below means a combination of the primary particle having a fine particle on its surface and a secondary particle including an aggregate of the primary particles.

[Composition]

The positive electrode active material of the present invention includes the lithium-nickel composite oxide which is a layered compound having a hexagonal crystal structure, and the value of (1-x-y) showing the content of nickel (Ni) in the general formula (1) is 0.84 or more and less than 1.

In the positive electrode active material of the present invention, in accordance with increase of the content of nickel, electric capacity of Li ion battery increases when the positive electrode active material is used in a positive electrode. However, when the content of nickel is excessively larger, thermal stability cannot be sufficiently increased, and there is a tendency that cation mixing occurs in calcining. To the contrary, when the content of nickel is excessively lower, electric capacity of the positive electrode active material tends to be lowered, and there arises a problem such that electric capacity of the positive electrode active material per volume of a battery cannot be sufficiently increased even though chargeability of a positive electrode is increased.

Therefore, the content of nickel of the lithium-nickel composite oxide in the positive electrode active material of the present invention is preferably 0.84 or more and 0.98 or less, more preferably 0.845 or more and 0.950 or less, and even more preferably 0.85 or more and 0.95 or less.

The symbol of x showing the content of cobalt (Co) satisfies $0<x\leq0.15$, preferably $0.02\leq x\leq0.15$, more preferably $0.03\leq x\leq0.13$.

Since the content of cobalt is within the above-mentioned range, excellent cycle characteristics and thermal stability are exhibited. In accordance with increase of the content of cobalt, cycle characteristics of the positive electrode active material can be improved. However, when the content of cobalt exceeds 0.15, it becomes difficult to increase electric capacity of the positive electrode active material.

In addition, the symbol of y which shows the content of at least one element M selected from Mg, Al, Ca, Ti, V, Cr, Mn, Nb, Zr and Mo satisfies $0<y\leq0.07$, preferably $0.01\leq y\leq0.05$. Since the content of M is within the above-mentioned range, excellent cycle characteristics and thermal stability are exhibited.

When y exceeds 0.07, it becomes difficult to increase electric capacity of the positive electrode active material. When an additive element is not added to the positive electrode active material, battery characteristics cannot be sufficiently improved. Therefore, in order to sufficiently improve the battery characteristics, it is preferred to control y to 0.01 or more.

The symbol of b showing the content of lithium (Li) satisfies $0.95\leq b\leq1.03$. When b is less than 0.95, a metal element such as Ni is incorporated into a lithium layer of the layered compound, and insertion-extraction of Li is lowered. Therefore, battery capacity and output characteristics are lowered. On the other hand, when b exceeds 1.03, Li is incorporated into the metal layer of the layered compound. Therefore, battery capacity is lowered.

Accordingly, in order to increase battery capacity and improve output characteristics, the content of lithium of the lithium-nickel composite oxide in the positive electrode active material of the present invention satisfies $0.95\leq b\leq1.03$, preferably $0.95\leq b\leq1.01$.

[Length of c-Axis]

In the positive electrode active material of the present invention, the content of nickel in the lithium-nickel composite oxide is 0.84 or more, preferably 0.98 or less. Therefore, the lithium-nickel composite oxide includes nickel in a very high content.

When the content of nickel in the lithium-nickel composite oxide is so high, there arises a problem such as lowering of thermal stability. Therefore, the content of nickel is usually controlled to less than 0.84, generally to 0.80 to 0.83 or so.

In the positive electrode active material of the present invention, the content of nickel in the lithium-nickel composite oxide can be increased by appropriately controlling the length of c-axis as determined by Rietveld analysis of X-ray diffraction of a crystal of the lithium-nickel composite oxide.

More specifically, in the positive electrode active material of the present invention, the content of nickel in the lithium-nickel composite oxide can be increased by controlling the length of c-axis (hereinafter, simply referred to as length of the c-axis) to 14.183 angstrom or more, preferably to 14.185 angstrom or more as determined by Rietveld analysis of X-ray diffraction of a crystal of the lithium-nickel composite oxide.

In addition, when a lithium-nickel composite oxide having a hexagonal crystal structure is used in the positive electrode active material of the present invention, the length of c-axis affects insertion-extraction of lithium (Li) from a crystal.

In accordance with the increase of the length of c-axis, the interlayer distance of the lithium layer is generally increased. Therefore, insertion-extraction of Li from a crystal is improved. When the lithium-nickel composite oxide is used in a positive electrode active material, electric capacity and output of the positive electrode active material can be increased.

On the other hand, when the length of c-axis of the crystal of the lithium-nickel composite oxide is shortened, insertion-extraction of Li from a crystal is lowered. Therefore, when such a lithium-nickel composite oxide is used in a positive electrode active material, electric capacity and output of the positive electrode active material are lowered. In addition, cycle characteristics and thermal stability of the positive electrode active material are lowered because crystallinity of the lithium-nickel composite oxide is lowered due to cation mixing.

For example, when the length of c-axis is less than 14.183 angstrom, insertion-extraction of Li from a crystal is lowered. Therefore, battery capacity and output characteristics of a positive electrode active material are lowered.

According to the positive electrode active material of the present invention, since the length of c-axis is 14.183 angstrom or more, the positive electrode active material is excellent in insertion-extraction of Li from a crystal, and has high electric capacity and high output.

In other words, according to the positive electrode active material of the present invention, since the length of c-axis is controlled to 14.183 angstrom or more, the positive electrode active material has high electric capacity based on increase of the content of nickel, as well as high electric capacity and high output based on increase of the length of c-axis.

The upper limit of the length of c-axis is not particularly limited. The upper limit is 14.205 angstrom or so. In the positive electrode active material of the present invention, it is preferred that the length of c-axis is 14.183 angstrom or more and 14.205 angstrom or less.

It is preferred that the length of c-axis is controlled to 14.185 angstrom or more, and 14.200 angstrom or less from the viewpoint of increase in electric capacity based on higher crystallinity and improvement in thermal stability.

[Fine Particle Containing W and Li]

When the surface of a positive electrode active material is completely covered with a heterogeneous compound, migration (intercalation) of lithium ions is generally greatly inhibited. As a result, merits exhibited by the positive electrode active material, such as high electric capacity are to be lowered.

To the contrary, according to the present invention, a fine particle containing tungsten (W) and lithium (Li) is formed on the surface of the primary particle of the lithium-nickel composite oxide. This fine particle has high lithium ion conductivity, and shows a property for accelerating migration of lithium ions. Therefore, when the fine particle is formed on the surface of the primary particle, a conduction path for Li is formed at the interface between the primary particle and an electrolytic solution. Thereby, reaction resistance of an active material is lowered, and output characteristics are improved.

When the surface of the composite oxide particle is covered with a layered substance, a specific surface area of the composite oxide particle is lowered irrespective of the thickness of a covered layer. Therefore, even if the covered layer has a high lithium ion conductivity, the area contacted with an electrolytic solution becomes smaller. Thereby, lowering of charge-discharge capacity and increase in reaction resistance are apt to be caused.

In contrast, according to the present invention, since the fine particle is formed on the surface of the primary particle, the area contacted with an electrolytic solution is sufficiently increased, and lithium ion conduction can be effectively improved. Therefore, lowering of charge-discharge electric capacity can be suppressed, and reaction resistance can be reduced.

It is preferred that the particle diameter of the fine particle is 1 nm to 100 nm.

When the particle diameter is less than 1 nm, the fine particle sometimes does not have sufficient lithium ion conductivity. In addition, when the particle diameter exceeds 100 nm, a coating of the fine particle becomes uneven, and reaction resistance is not sometimes sufficiently reduced.

Furthermore, it is important that the fine particle is formed on the surface of the primary particle because the contact of an electrolytic solution occurs on the surface of the primary particle.

Incidentally, in the present invention, the surface of the primary particle includes the surface of the primary particle which is exposed to the outer surface of the secondary particle, an inside of the primary particle to which an electrolytic solution can be immersed from the surface of the primary particle which is exposed to the outer surface of the secondary particle, and the surface of the primary particle which is exposed to a space existing in the secondary particle, to which an electrolytic solution can be immersed. In addition, the surface of the primary particle includes a grain boundary between primary particles if bonding of the primary particles is insufficient, and an electrolytic solution can be impregnated into the grain boundary.

Therefore, when the fine particle is formed on the entire surface of the primary particle, migration of lithium ions is further accelerated, and reaction resistance of the composite oxide particle can be further reduced.

In addition, there is no necessity that the whole surface of this fine particle is completely covered with the primary particles, and the surface of the primary particle is dotted with the fine particles. When the surface of the primary particle is dotted with the fine particles, reaction resistance can be reduced if the fine particles exist on the outer surface of the primary particle and on the surface of the primary particle exposed to the space existing in the secondary particle.

The nature of the surface of the primary particle can be examined, for example, by observing the surface with a field emission type scanning electron microscope. As to the positive electrode active material for a non-aqueous electrolyte secondary battery of the present invention, it has been confirmed that the fine particle containing W and Li has been formed on the surface of the primary particle made of the lithium-nickel composite oxide.

On the other hand, when the fine particles are unevenly formed between the lithium-nickel composite oxide particles, since lithium ions are not uniformly migrated between the particles, and a load is applied to a specific composite oxide particle. Therefore, cycle characteristics are apt to be lowered, and reaction resistance is easily increased. Accordingly, it is preferred that the fine particles are evenly formed between the lithium-nickel composite oxide particles.

In the present invention, the fine particle contains W and Li. It is preferred that W and Li are formed into lithium tungstate. The lithium tungstate is preferably at least one member selected from $Li_2WO_4$, $Li_4WO_5$, $Li_6WO_6$, $Li_2W_4O_{13}$, $Li_2W_2O_7$, $Li_6W_2O_9$, $Li_2W_2O_7$, $Li_2W_5O_{16}$, $Li_9W_{19}O_{55}$, $Li_3W_{10}O_{30}$, $Li_{18}W_5O_{15}$ and hydrates thereof. When the lithium tungstate is formed, lithium ion conductivity more increases, and reaction resistance can be efficiently reduced.

It is preferred that the amount of tungsten included in the fine particle is 0.1 atom % to 3.0 atom % based on the sum of the numbers of Ni, Co and M atoms included in the composite oxide particle. This fine particle achieves both high charge-discharge capacity and excellent output characteristics at a time.

When the amount of tungsten is less than 0.1 atom %, output characteristics are not sometimes sufficiently improved. When the amount of tungsten exceeds 3.0 atom %, since the amount of the fine particle being formed is excessively large, and lithium conduction between the lithium-nickel composite oxide particle and an electrolytic solution is inhibited, charge-discharge capacity is sometimes lowered.

In addition, the amount of lithium included in the fine particle is not particularly limited. When lithium is included in the fine particle, lithium ion conductivity can be increased. However, it is preferred that the amount of lithium is adjusted so that lithium tungstate is sufficiently formed.

When the amount of tungsten is adjusted to 0.1 atom % to 3.0 atom %, it is preferred that the positive electrode active material is represented by the following general formula (2):

(Chem. 2)

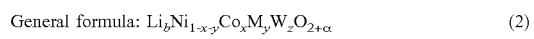

General formula: $Li_bNi_{1-x-y}Co_xM_yW_zO_{2+\alpha}$ (2)

wherein M is at least one element selected from Mg, Al, Ca, Ti, V, Cr, Mn, Nb, Zr and Mo, b is a numeral satisfying $0.95<b\leq1.10$, x is a numeral satisfying $0<x\leq0.15$, y is a numeral satisfying $0<y\leq0.07$, the sum of x+y is a numeral satisfying $x+y\leq0.16$, z is a numeral satisfying $0.001\leq z\leq0.03$, and $\alpha$ is a numeral satisfying $0\leq\alpha\leq0.2$.

The symbol of b showing a content of lithium (Li) satisfies $0.95\leq b\leq1.10$. When b exceeds 1.10, lithium is consumed in the fine particle formed on the surface of the primary particle. However, the content of lithium in the lithium-nickel composite oxide becomes excessively high, and Li is sometimes incorporated into a metal layer of the layered compound. On the other hand, when b is 0.95 or less, lithium is consumed in the fine particle. As a result, a metal element such as Ni is apt to be easily incorporated into a lithium layer of the layered compound. Therefore, in order to increase battery capacity and improve output characteristics, it is preferred that b is a numeral satisfying 0.95<b≤1.08.

[Average Particle Diameter]

The positive electrode active material of the present invention includes the lithium-nickel composite oxide particle as described above. The average particle diameter of the composite oxide particles is preferably 8 µm to 20 µm.

When the average particle diameter of the composite oxide particles is less than 8 µm, filling property in a positive electrode is lowered in the case where the composite oxide particle is used as a positive electrode active material of a battery, and a battery capacity per volume is sometimes lowered. On the other hand, when the average particle diameter of the composite oxide particles exceeds 20 µm, the contact area between a positive electrode active material and an electrolytic solution of a battery is decreased, and battery capacity and output characteristics are sometimes lowered.

Therefore, in the positive electrode active material of the present invention, in order to maintain battery capacity and output characteristics, and increase filling property in the positive electrode, the average particle diameter of the composite oxide particles is preferably 8 µm to 20 µm, and more preferably to 8 µm to 17 µm.

The positive electrode active material of the present invention includes the primary particle and the secondary particle including an aggregate of the primary particles. When the positive electrode active material having the above particle structure is employed, the contact of an electrolytic solution can be achieved not only on the outer surface of the secondary particle including an aggregate of the primary particles, but also an inside of the primary particle to which an electrolytic solution can be immersed from the surface of the primary particle which is exposed to the outer surface of the secondary particle, the surface of the primary particle which is exposed to a space existing in the secondary particle, to which an electrolytic solution can be immersed, and at an incomplete grain boundary.

In order to make a contact with an electrolytic solution, the average particle diameter of the composite oxide particles of the present invention is controlled to 8 µm to 20 µm. Within this range of the average particle diameter, both of contact with an electrolytic solution and filling property can be achieved at a time.

In addition, the specific surface area of the positive electrode active material is preferably within a range of 0.4 m²/g to 1.2 m²/g, and more preferably within a range of 0.4 m²/g to 1.0 m²/g as determined by a BET method.

When the positive electrode active material has the above specific surface area, the contact with the electrolytic solution can be appropriately controlled, and battery capacity and output characteristics can be more increased. However, when the specific surface area is less than 0.4 m²/g, the contact area with an electrolytic solution is excessively lowered. When the specific surface area exceeds 1.2 m²/g, the contact area with an electrolytic solution is excessively increased, and thermal stability is sometimes lowered.

In the present invention, a porosity determined by observation of a cross-section of the secondary particle, that is, a porosity of a space which includes the fine particle containing tungsten and lithium in the secondary particle is preferably 0.5% to 4%, and more preferably 0.7% to 3.5%.

As described above, the porosity as referred herein is a value obtained by calculation, in which the fine particle containing tungsten and lithium existing in a space of the secondary particle is included in the space for the calculation. In other words, the space means an area where the lithium-nickel composite oxide represented by the general formula (1) does not exist in the cross-section of the secondary particle.

When the porosity is controlled as mentioned above, an electrolytic solution can be sufficiently impregnated into the secondary particle, and battery capacity and output characteristics can be more improved. On the other hand, when the porosity exceeds 4%, crystallinity becomes insufficient, and reaction resistance is sometimes increased.

Incidentally, the porosity can be determined by observing an arbitrary cross-section of the secondary particle by means of a scanning electron microscope, and analyzing its image.

The porosity can be determined by, for example, embedding plural secondary particles in a resin or the like, processing the resulting embedded product by a cross-section polishing process or the like so as to enable to observe a cross-section of the secondary particles, and thereafter, selecting twenty or more arbitrary secondary particles, coloring spaces existing in the secondary particles black, and coloring the compact area within the outline of the secondary particles white, measuring the total area of the secondary particles by means of an image analysis software: WinRoof 6.1.1 or the like, and calculating the area ratio of [black portions/(black portions+white portions)].

(2) Method for Producing Positive Electrode Active Material

Hereinafter, a method for producing a positive electrode active material for a non-aqueous electrolyte secondary battery of the present invention will be specifically explained based on each step employed in the method.

The method for producing a positive electrode active material of the present invention is characterized in that the method includes the following steps (A) to (D):

(A) Step for Calcining

The step for calcining is a step for preparing a calcined powder of the lithium-nickel composite oxide represented by the following general formula (3), including the primary particle and the secondary particle including an aggregate of the primary particles, which includes calcining a lithium mixture obtained by mixing a nickel compound with a lithium compound at a temperature of 700° C. to 780° C. in an oxidizing atmosphere such as an oxygen atmosphere.

(Chem. 3)

General formula: $Li_aNi_{1-x-y}Co_xM_yO_2$ (3)

wherein M is at least one element selected from Mg, Al, Ca, Ti, V, Cr, Mn, Nb, Zr and Mo, a is a numeral satisfying 0.98≤a≤1.11, x is a numeral satisfying 0<x≤0.15, y is a numeral satisfying 0<y≤0.07, and the sum of x+y is a numeral satisfying x+y≤0.16.

[Nickel Compound]

The nickel compound which is used in the step for calcining is a compound containing nickel and cobalt, and at least one element selected from Mg, Al, Ca, Ti, V, Cr, Mn, Nb, Zr and Mo as an additive element M.

As the nickel compound which is used as a raw material in the step for calcining, for example, any one of a nickel composite hydroxide, a nickel composite oxyhydroxide obtained by oxidizing the nickel composite hydroxide with an oxidizing agent, a nickel composite oxide obtained by oxidizing and calcining the nickel composite oxyhydroxide at a temperature of 500° C. to 750° C., a nickel composite oxide obtained by oxidizing and calcining the nickel composite hydroxide at a temperature of 500° C. to 750° C., and a nickel composite oxide obtained by oxidizing and calcining a mixture of the nickel composite hydroxide and the nickel composite oxyhydroxide at a temperature of 500° C. to 750° C. can also be used.

The nickel composite hydroxide which is used as this nickel compound is not particularly limited. As the nickel composite hydroxide, for example, a nickel composite hydroxide obtained by a crystallization method such as a co-precipitation method or a uniform precipitation method can be used.

According to the precipitation method, a nickel composite hydroxide can be obtained under various conditions, and the conditions for precipitation are not particularly limited. It is preferred that a nickel composite hydroxide is one which is prepared under the following conditions:

Specifically, It is preferred that the nickel composite hydroxide is one which is prepared by adding dropwise an aqueous solution of a metal compound containing nickel and cobalt, and at least one element selected from Mg, Al, Ca, Ti, V, Cr, Mn, Nb, Zr and Mo as an additive element M, and an aqueous solution including an ammonium ion supply source to a reaction vessel which is heated to a temperature of 40° C. to 60° C.

In particular, it is preferred that the nickel composite hydroxide is one which is prepared by adding dropwise an aqueous solution of an alkali metal hydroxide as occasion demands to the resulting reaction solution so that the reaction solution maintains alkalinity, preferably a pH of 10 to 14 at a liquid temperature of 25° C.

Incidentally, the additive element M can be co-precipitated together with nickel and cobalt. The nickel composite hydroxide also can be obtained by crystallizing the nickel cobalt hydroxide, and covering the nickel cobalt hydroxide with the metal compound containing the additive element M, or impregnating an aqueous solution containing the metal compound in the nickel cobalt hydroxide.

When the nickel composite hydroxide is prepared by the crystallization method, the nickel composite hydroxide becomes a powdery product having a high bulk density.

In addition, when the nickel composite hydroxide having a high bulk density is used, a lithium-nickel composite oxide particle having a small specific surface area can be easily obtained after a step for washing with water, which is employed after the step for calcining. Therefore, the nickel composite hydroxide is suitable for a raw material of a lithium-nickel composite oxide which is used in a non-aqueous electrolyte secondary battery.

When nickel hydroxide is crystallized at a temperature higher than 60° C., or at a pH higher than 14, since nucleation predominantly advances in a liquid and crystallization does not sufficiently advance, only a fine powder is sometimes generated. On the other hand, when the nickel composite hydroxide is crystallized at a temperature lower than 40° C. or at a pH lower than 10, since nucleation hardly advances in the liquid, and growth of a crystal of a powder predominantly advances, a coarse particle is sometimes incorporated into the resulting nickel composite hydroxide. In addition, the amount of metal ions remaining in the reaction solution is increased, and the metal ions sometimes cause deviation in composition.

When the nickel composite hydroxide which contains a coarse particle or in which deviation is caused in its composition is used as a raw material of the lithium-nickel composite oxide, battery characteristics of a positive electrode active material obtained is lowered.

Therefore, when the nickel composite hydroxide which is used as the nickel compound in the step for calcining is obtained by a crystallization method, it is preferred that crystallization is carried out under the conditions that a reaction solution is maintained at 40° C. to 60° C., and that a pH of the reaction solution is maintained at 10 to 14 at a liquid temperature of 25° C.

In the step for calcining, a nickel composite oxyhydroxide can be used as the nickel compound. A method for preparing the nickel oxyhydroxide is not particularly limited. It is preferred that the nickel oxyhydroxide is prepared by oxidizing the nickel composite hydroxide with an oxidizing agent such as sodium hypochlorite or an aqueous hydrogen peroxide solution. When the nickel composite oxyhydroxide is prepared by this method, the nickel composite oxyhydroxide becomes a powdery product having a high bulk density.

When the nickel composite oxyhydroxide having a high bulk density is used, since a lithium-nickel composite oxyhydroxide particle having a small specific surface area can be easily produced after the step for calcining, the nickel composite oxyhydroxide is suitable for a raw material of a lithium-nickel composite oxide which is used as a positive electrode active material for a non-aqueous electrolyte secondary battery.

In addition, a nickel composite oxide also can be used as the nickel compound in the step for calcining.

A method for preparing the nickel composite oxide is not particularly limited. It is preferred that the nickel composite hydroxide or the nickel composite oxyhydroxide is calcined and oxidized at a temperature of 500° C. to 750° C., preferably 550° C. to 700° C. in an oxidizing atmosphere.

When the nickel composite oxide obtained in the above is used, and the lithium-nickel composite oxide is produced by calcining a mixture containing the nickel composite oxide, the ratio of Li to a metal other than Li contained in the lithium-nickel composite oxide can be stabilized. As a result, there can be obtained some merits such that high electric capacity and high output can be achieved when the lithium-nickel composite oxide is used as a positive electrode active material.

In the case where the nickel composite hydroxide or the nickel composite oxyhydroxide is oxidized and calcined, when the temperature at oxidizing and calcining is lower than 500° C., conversion of the nickel composite hydroxide or the nickel composite oxyhydroxide to its oxide is sometimes becomes insufficient.

When the nickel composite oxide in which the above conversion is insufficient is used for preparing a lithium-nickel composite oxide, it is difficult to stabilize its composition, and ununiformity in its composition is apt to be caused.

In addition, when the nickel composite hydroxide or the like remains in the nickel composite oxide after oxidizing and calcining, water vapor is generated during calcining, to cause inhibition of a reaction between the lithium compound and the nickel composite oxide. Therefore, there sometimes arises a problem such that crystallinity is lowered.

On the other hand, when the temperature at oxidizing and calcining exceeds 750° C., crystallinity of a resulting nickel composite oxide is increased, and reactivity between the lithium compound and the nickel composite oxide is lowered during calcining in a post-process. Therefore, crystallinity of a finally obtained lithium-nickel composite oxide is lowered, and the length of c-axis sometimes does not become 14.183 angstrom or more.

In addition, the nickel composite oxide is rapidly granulated, and a coarse nickel composite oxide particle is formed. Therefore, when the lithium-nickel composite oxide is produced by calcining a mixture of the nickel composite oxide and the lithium compound, there is a possibility that the average particle diameter of the lithium-nickel composite oxide becomes excessively large.

Therefore, when the nickel composite oxide is prepared by oxidizing and calcining the nickel composite hydroxide or the nickel composite oxyhydroxide in an oxidizing atmosphere, oxidizing and calcining is carried out at a temperature of preferably 500° C. to 750° C., more preferably 550° C. to 700° C.

In addition, the retention period of time at the above temperature for oxidizing and calcining is preferably 1 hour to 10 hours, and more preferably to 2 hours to 6 hours. When the retention period of time is shorter than 1 hour, conversion to an oxide sometimes becomes incompletely, and when the retention period of time exceeds 10 hours, crystallinity of the nickel composite oxide sometimes becomes excessively high.

The atmosphere where oxidizing and calcining is carried out can be an oxidizing atmosphere. It is preferred that the atmosphere is the air in view of handling and cost.

The content of sulfate radical ($SO_4$) in the nickel composite hydroxide which is used as the nickel compound is preferably 0.1% to 0.4% by mass, and more preferably 0.1% to 0.3% by mass. Thereby, crystallinity of the lithium-nickel composite oxide can be easily controlled in the subsequent calcination step. In other words, when the content of the sulfate radical is controlled to 0.1% to 0.4% by mass, the length of c-axis can be easily controlled. In addition, since shrinkage of the secondary particle due to the growth of the primary particle during calcination can be appropriately controlled, porosity also can be easily controlled.

However, when the content of the sulfate radical is less than 0.1% by mass, crystallization of the lithium-nickel composite oxide excessively proceeds rapidly, and the length of c-axis of the crystal of the lithium-nickel composite oxide sometimes does not become 14.183 angstrom or more. In addition, shrinkage of the secondary particle becomes greater due to the growth of the primary particle, and specific surface area and porosity of the lithium-nickel composite oxide becomes excessively smaller. On the other hand, when the content of the sulfate radical exceeds 0.4% by mass, since growth of the primary particle is suppressed, specific surface area and porosity of the lithium-nickel composite oxide becomes excessively greater.

In addition, the nickel composite oxyhydroxide and the nickel composite oxide, which are obtained from the nickel composite hydroxide, contain sulfate radical in an amount almost equal to the amount of sulfate radical included in the nickel composite hydroxide.

Therefore, when the content of the sulfate radical ($SO_4$) in the nickel composite hydroxide is controlled to 0.1% to 0.4% by mass, an active material prepared by using the nickel composite oxyhydroxide obtained from the nickel composite hydroxide or the nickel composite oxide as a raw material exhibits substantially the same effects as the nickel composite hydroxide.

It is preferred that the nickel composite hydroxide is a nickel composite hydroxide obtained by a crystallization method. It is also preferred that the nickel composite hydroxide is prepared by using a sulfate such as nickel sulfate as a raw material when preparing by using the crystallization method, and sufficiently washing the resulting nickel composite hydroxide after crystallization so that the sulfate radical is contained in the nickel composite hydroxide in a content of 0.1% to 0.4% by mass.

In addition, it is preferred that the above washing is carried out by using an aqueous alkali solution of which pH is controlled to 11 to 13 at a liquid temperature of 25° C. When the pH of the aqueous alkali solution is lower than 11, the content of sulfate radical sometimes cannot be reduced to 0.1% to 0.4% by mass. When the pH of the aqueous alkali solution exceeds 13, an effect for reducing the amount of sulfate radical is not so improved, and there is a possibility that cations contained in the aqueous alkali solution will remain as impurities.

It is preferred that the aqueous alkali solution is an aqueous solution of an alkali metal hydroxide such as sodium hydroxide, or a carbonate such as sodium carbonate. It is preferred to wash the nickel composite hydroxide with water after the nickel composite hydroxide is washed with the aqueous alkali solution.

[Mixing with Lithium Compound]

A lithium compound which is mixed with the nickel compound is not particularly limited. It is preferred to use at least one member selected from the group consisting of lithium hydroxide, lithium oxyhydroxide, lithium oxide, lithium carbonate, lithium nitrate and a lithium halide.

When the above lithium compound is used, there is an advantage such that impurities would not remain after calcination. It is more preferred to use lithium hydroxide having a favorable reactivity to the nickel compound.

The mixing ratio of the nickel compound to the lithium compound is not particularly limited. The composition of lithium and a metal element other than lithium contained in the lithium-nickel composite oxide after calcination is maintained almost equal to the composition of a mixture obtained by mixing the nickel compound with the lithium compound.

Therefore, it is preferred that the molar ratio of lithium contained in the lithium compound to the total of nickel and other metal elements contained in the nickel compound is controlled to 0.98 to 1.11.

When the molar ratio is less than 0.98, crystallinity of the resulting calcined powder sometimes is very lowered, and the molar ratio of lithium contained in the resulting calcined powder sometimes becomes less than 0.98.

On the other hand, when the molar ratio exceeds 1.11, since calcination is easily progressed, over-calcination is sometimes caused, and there is a possibility that the molar ratio of lithium contained in the resulting calcined powder sometimes exceeds 1.11.

An apparatus and a method for mixing the nickel compound with the lithium compound can be any apparatuses and any methods if the nickel compound can be uniformly mixed with the lithium compound, and the apparatus and the method are not particularly limited. As an apparatus, a dry type mixing machine such as a V-blender or a mixing granulator can be used.

[Calcination]

A lithium mixture obtained by mixing the nickel compound with the lithium compound is calcined at a temperature of 700° C. to 780° C., preferably at a temperature of 730° C. to 760° C. in an oxidizing atmosphere.

When the lithium mixture is calcined at a temperature exceeding 500° C., although a lithium-nickel composite oxide is produced, a crystal does not sufficiently grow up, and its structure become unstable at a temperature lower than 700° C. When such a lithium-nickel composite oxide is used as a positive electrode active material, the crystal structure of the positive electrode active material is easily destroyed by phase transition due to charging and discharging, or the like. Also, the primary particle is does not sufficiently grow up, and the specific surface area and the porosity of the lithium-nickel composite oxide are sometimes excessively increased.

On the other hand, when the lithium mixture is calcined at a temperature exceeding 780° C., cation mixing comes to be easily generated, and the layered structure in the crystal of the lithium-nickel composite oxide is destroyed. Therefore, there is a possibility that insertion and extraction of lithium ions become difficult. Also, the length of c-axis is not attained to 14.183 angstrom or more.

Moreover, there is a possibility that the crystal of the lithium-nickel composite oxide is decomposed, and that nickel oxide or the like is generated. Furthermore, since the composite oxide particle is sintered, and a coarse composite oxide particle is formed, the average particle diameter of the lithium-nickel composite oxide sometimes becomes excessively large. In addition, since the primary particle is grows up, specific surface area and porosity of the lithium-nickel composite oxide are sometimes excessively lowered.

Therefore, the lithium mixture is calcined at a calcination temperature of 700° C. to 780° C., preferably 730° C. to 760° C., so that the length of c-axis becomes 14.183 angstrom or more as determined by a Rietveld analysis of X-ray diffraction.

In addition, the retention period of time at the calcination temperature is preferably 1 hour to 6 hours, and more preferably to 2 hours to 4 hours. When the retention period of time is shorter than 1 hour, crystallization becomes insufficient, and the length of c-axis sometimes is not attained to 14.183 angstrom or more. When the retention period of time is longer than 6 hours, calcination excessively progresses, and cation mixing is sometimes caused.

In order to remove crystal water and the like from the lithium compound, and carry out a homogeneous reaction within a temperature range in which growth of the crystal of the lithium-nickel composite oxide progresses, it is especially preferred that calcination is carried out in 2 steps of calcining at a temperature of 400° C. to 600° C. for 1 hour to 5 hours, and subsequently calcining at a temperature of 700° C. to 780° C. for 3 hours or more.

When this calcination is carried out, a lithium-nickel composite oxide can be synthesized in an oxidizing atmosphere. The oxidizing atmosphere is preferably a mixed gas of 18% to 100% by volume of oxygen and an inert gas, and more preferably a mixed gas having an oxygen concentration of 90% by volume or more.

When the calcination is carried out in an atmosphere having an oxygen concentration of 18% by volume or more, that is, in an atmosphere having an oxygen content higher than the air, reactivity of the lithium compound and the nickel compound can be improved.

In order to further improve the reactivity to give a lithium-nickel composite oxide excellent in crystallinity, it is more preferred that the oxidizing atmosphere is a mixed gas having an oxygen concentration of 90% by volume or more, and it is even more preferred that the oxidizing atmosphere is an oxygen atmosphere (concentration oxygen is 100%).

An apparatus and a method for calcining a lithium mixture are not particularly limited. As the apparatus, for example, a calcination furnace such as an electric furnace, a kiln, a tubular furnace or a pusher furnace, in which the oxidizing atmosphere can be controlled to a gas atmosphere having an oxygen concentration of 18% by volume or more, such as an oxygen atmosphere or a dried air from which moisture and carbon dioxide are removed, can be used.

As described above, a calcined powder of a lithium-nickel composite oxide represented by the following general formula (4), which contains the primary particle and the secondary particle including an aggregate of the primary particles, in which the length of the c-axis of the crystal of the lithium-nickel composite oxide is 14.183 angstrom or more as determined by a Rietveld analysis of X-ray diffraction is prepared.

When a positive electrode active material obtained from this calcined powder is used in a positive electrode of a battery, thermal stability and the like can be maintained, and moreover high electric capacity and high output can be realized since insertion and extraction of lithium ions easily occur.

(Chem. 4)

General formula: $Li_aNi_{1-x-y}Co_xM_yO_2$ (4)

wherein M is at least one element selected from Mg, Al, Ca, Ti, V, Cr, Mn, Nb, Zr and Mo, a is a numeral satisfying 0.98≤b≤1.11, x is a numeral satisfying 0<x≤0.15, y is a numeral satisfying 0<y≤0.07, and the sum of x+y is a numeral satisfying x+y≤0.16.

In the above case, when the symbol "a" showing a content of lithium in the calcined powder is less than 0.98, crystallinity of the calcined powder is lowered, and the molar ratio of lithium to metals other than lithium contained in the lithium-nickel composite oxide after a process for washing with water becomes less than 0.95, which becomes a factor for causing significant lowering in battery capacity at carrying out a charge-discharge cycle.

On the other hand, when the symbol "a" is exceeds 1.11, a large amount of the lithium compound excessively exists on the surface of the calcined powder, and it becomes difficult to remove the excess lithium compound by washing with water. When a positive electrode active material from which the excess lithium compound is not sufficiently removed is used, not only a large amount of gas is generated at the time of charging of a battery but also it becomes a factor for causing a trouble, because the lithium compound has a powdery form showing a high pH, and reacts with a material such as an organic solvent which is used in producing an electrode to form a slurry, and the slurry is gelated.

Furthermore, since the content of lithium of the lithium-nickel composite oxide in the positive electrode active material exceeds 1.03, battery capacity is lowered, and internal resistance of a positive electrode is increased when the positive electrode active material thus obtained is used as a positive electrode active material of a battery.

As a method for preparing a calcined powder of the lithium-nickel composite oxide, a method for preparing the calcined powder of the lithium-nickel composite oxide, which includes using the nickel compound in which a metal element other than lithium is solid-solubilized or dispersed by a crystallization method, and the lithium compound as raw materials, mixing these compounds, and calcining the resulting mixture has been described in the above.

However, the method of preparing the calcined powder is not particularly limited. As the method for preparing the calcined powder, there can be cited, for example, a method for mixing all of aqueous solutions containing a desired metal element, and carrying out a treatment of atomized pyrolysis of the resulting mixed solution, and a method for pulverizing and mixing all of the compounds containing a desired metal element by means of a mechanical pulverization such as ball milling, and thereafter calcining the resulting mixture. It is preferred that the calcined powder of a lithium-nickel composite oxide is prepared by the above-mentioned method in order to obtain a positive electrode active material having a small specific surface area and satisfactory thermal stability.

(B) Step for Washing with Water

The step for washing with water is a step for washing the calcined powder of the lithium-nickel composite oxide which is obtained in the step for calcining with water.

Specifically, the calcined powder is mixed with water so that the amount of the calcined powder is 700 g to 2000 g per 1 L of water to form the slurry, the calcined powder is washed with water in the form of the slurry, and thereafter the slurry is filtrated and dried to give a lithium-nickel composite oxide powder (powder washed with water).

In the step for washing with water, a temperature of water during washing with water is controlled to preferably 10° C. to 40° C., more preferably to 10° C. to 30° C.

When the temperature of water during washing with water is controlled to the above temperature, impurities existing on the surface of the calcined powder of the lithium-nickel composite oxide are removed, and the residual amount of the lithium compound such as lithium carbonate or lithium hydroxide existing on the surface can be reduced to 0.10% by mass or less based on the total amount of the powder washed with water.

According to this step, when a positive electrode active material obtained by using the calcined powder which is washed with water is used in a positive electrode of a battery, generation of gas can be suppressed during maintaining at high temperatures, and high electric capacity, high output and high safety can be achieved at a time.

To the contrary, when the temperature of water during washing with water is lower than 10° C., since the calcined powder cannot be sufficiently washed with water, impurities existing on the surface of the calcined powder are not sufficiently removed, and the impurities sometimes remain on the surface of the calcined powder. When the impurities remain on the surface of the calcined powder in a large amount, electric resistance of the surface of the positive electrode active material in which the calcined powder is used is increased. Therefore, when the positive electrode active material is used in a positive electrode of a battery, electric resistance of the positive electrode is increased. Moreover, a specific surface area of the positive electrode active material becomes excessively small, and reactivity of the positive electrode active material with an electrolytic solution is decreased. When the positive electrode active material is used in a positive electrode of a battery, high electric capacity and high output cannot be achieved.

Furthermore, the amount of lithium remaining on the surface of the composite oxide particle used in the calcined powder exceeds 0.10% by mass, and gas is easily generated when the calcined powder is stored at a high temperature which is employed when a battery is used.

On the other hand, when the temperature of water at washing with water exceeds 40° C., the amount of lithium which is eluted from the calcined powder becomes greater, and there is a possibility that nickel oxide (NiO) from which Li has been released or nickel oxyhydroxide (NiOOH) formed by substituting Li of the calcined powder with H is sometimes generated. Since both nickel oxide (NiO) and nickel oxyhydroxide (NiOOH) have high electrical resistance, electric resistance of the surface of the composite oxide particle increases, and electric capacity of a positive electrode active material is lowered due to decrease of the amount of Li of the lithium-nickel composite oxide.

In the step for washing with water, water is mixed with the calcined powder to form slurry, and the slurry is stirred to wash the calcined powder with water. At that time, the amount (g) of the calcined powder is adjusted to 700 g to 2000 g, preferably 700 g to 1500 g based on 1 L of water which is included in the slurry.

In accordance with increase of the concentration of the slurry, the amount of the calcined powder in the slurry increases. When the concentration of the slurry exceeds 2000 g/L, stirring comes to be difficult because viscosity of the slurry becomes higher. Moreover, since the concentration of an alkali in the liquid of the slurry increases, a dissolution speed of a deposited matter existing on the surface of the calcined powder is lowered due to its equilibrium relationship, and even though the deposited matter is removed from the surface of the calcined powder, the removed deposited matter will soon be adhered to the surface of the calcined powder again. Therefore, removal of impurities from the calcined powder comes to be difficult.

On the other hand, when the concentration of the slurry is lower than 700 g/L, since the slurry is excessively diluted, the amount of lithium which is eluted from the surface of each particle to the slurry becomes great. In particular, in accordance with increase of the ratio of nickel, the amount of lithium eluted from the surface of the particle becomes greater, and the amount of lithium existing on the surface is lowered. Therefore, lithium comes to be eluted from the crystal lattice of the lithium-nickel composite oxide, and the crystal of the lithium-nickel composite oxide comes to be easily collapsed.

Therefore, when the positive electrode active material thus obtained is used in a positive electrode of a battery, battery capacity of the battery is lowered.

The time period for washing the calcined powder with water is not particularly limited, and it is preferred to control the time period to 5 minutes to 60 minutes or so. When the time period for washing with water is excessively short, impurities existing on the surface of a particle are not sufficiently removed, and the impurities sometimes remain on the surface.

On the other hand, when the time period for washing with water is so long, improvement in washing effect cannot be expected, and productivity will be lowered.

The water which is used to form the slurry is not particularly limited. The electrical conductivity of the water is preferably less than 10 μS/cm, and more preferably 1 μS/cm or less in order to prevent decrease in battery performance due to the adherence of impurities to the surface of a positive electrode active material.

Furthermore, a tungsten compound containing lithium is added to the calcined powder during washing with water or after washing with water, and tungsten is dispersed on the surface of the primary particle of the lithium-nickel composite oxide. This process for dispersing tungsten will be specifically described in the following step for dispersing tungsten. It is preferred that the calcined powder which is washed with water is dried in accordance with the following method.

A temperature at which the calcined powder of the lithium-nickel composite oxide is dried and a method for drying the calcined powder after washing the calcined powder with water are not particularly limited. The temperature at which the calcined powder is dried is preferably 80° C. to 500° C., and more preferably 120° C. to 250° C. When the temperature is controlled to 80° C. or higher, the calcined powder after washing with water can be dried for a short period of time, and since gradient in concentration of lithium between the surface and the interior of the composite oxide particle can be suppressed, battery characteristics can be furthermore improved.

On the other hand, it is supposed that vicinity of the surface of the calcined powder after washing with water will be in a state very close to the stoichiometric ratio or in a state close to a charged state due to the elimination of lithium in a small amount. Therefore, when the temperature exceeds 500° C., there is a possibility that electrical characteristics are lowered due to a trigger of degradation of a crystal structure of a powder which is in a closely charged state.

Therefore, the drying temperature is preferably 80° C. to 500° C. in order to avoid lowering in physical properties of the calcined powder of the lithium-nickel composite oxide after washing with water and apprehension for lowering characteristics of the calcined powder of the lithium-nickel composite oxide when a positive electrode active material is used in a positive electrode of a battery, and more preferably 120° C. to 250° C. in view of productivity and reduction in cost for thermal energy.

It is preferred that drying of the calcined powder of the lithium-nickel composite oxide is carried out at a predetermined temperature by using a dryer which can control an atmosphere in the dryer to a gas atmosphere not containing a compound having carbon and sulfur or an atmosphere having a reduced pressure.

(C) Step for Adding Tungsten

A step for adding tungsten (W) is a step for adding a tungsten compound to the calcined powder during the step for washing with water or after the step for washing with water, to disperse tungsten (W) on the surface of the primary particle of the calcined particle.

In other words, addition of tungsten can be carried out by any one of addition of tungsten to slurry during the step for washing with water, addition of tungsten to the calcined powder after washing with water and before drying, and addition of tungsten to the calcined powder which has been dried after washing with water.

The amount of tungsten dispersed on the surface of the primary particle of the calcined powder is preferably 0.1 atom % to 3.0 atom % based on the sum of numbers of Ni, Co and M atoms contained in the calcined powder. Thereby, the fine particle containing W and Li can be formed on the surface of the primary particle of the positive electrode active material, and reaction resistance of an active material can be reduced by forming a conduction path of Li at the interface between the positive electrode active material and an electrolytic solution when the positive electrode active material is used in a positive electrode of a battery. Therefore, output characteristics can be improved.

(C-1) Addition of Tungsten to Slurry During Washing with Water

When tungsten (W) is added to the slurry during washing the slurry with water, tungsten (W) can be added in the form of any one of an alkali solution in which a tungsten compound is dissolved [hereinafter alkali solution in which a tungsten compound is dissolved is referred to as "alkali solution (W)"], and a tungsten compound.

When tungsten is added in the form of the alkali solution (W), the tungsten compound can be any compound which is soluble in the alkali solution. It is preferred to use a tungsten compound which is easily soluble in an alkali solution, such as tungsten oxide, lithium tungstate or ammonium tungstate.

As the alkali solution, a conventional alkali solution not containing an impurity which is harmful for a positive electrode active material is used in order to increase charge-discharge capacity.

As the alkali which is used in the alkali solution (W), ammonia and lithium hydroxide, which do not have a possibility to include an impurity can be used, and it is preferred to use lithium hydroxide from the viewpoint of avoidance of intercalation of lithium (Li).

Since Li is supplied by eluting the calcined powder of the lithium-nickel composite oxide, a pH of the alkali solution (W) can be adjusted so as to dissolve the tungsten compound in the alkali solution (W) when lithium hydroxide is used in the alkali solution (W). When lithium hydroxide is used in the alkali solution (W), Li can be supplied in an amount sufficient for forming a fine particle containing W and Li. Incidentally, an alkali such as ammonia can be used an auxiliary agent in the alkali solution (W) when the pH of the alkali solution (W) is controlled by using lithium hydroxide.

On the other hand, when the tungsten compound is added to the alkali solution (W), the tungsten compound is preferably a tungsten compound which is soluble in the alkali solution (W), more preferably a tungsten compound containing lithium, furthermore preferably lithium tungstate, and particularly preferably at least one member selected from $Li_2WO_4$, $Li_4WO_5$ and $Li_6W_2O_9$.

During washing the slurry with water, since the slurry shows alkaline due to Li eluted from the calcined powder of the lithium-nickel composite oxide, the tungsten compound soluble in the alkali solution (W) is not completely dissolved in the slurry, and is dispersed in the slurry in the form of fine particles, to adhere to the outer surface of the secondary particle of the lithium-nickel composite oxide. In addition, since a part of the tungsten compound dissolved in the slurry is permeated into the interior of a secondary particle, tungsten (W) can be dispersed on the surface of the primary particle.

After tungsten (W) is added to the slurry, the slurry is sufficiently stirred so that tungsten is permeated into the interior of the secondary particle, and then solid-liquid separation is carried out.

The amount of tungsten contained in the residual water after the solid-liquid separation is an amount of tungsten which is dispersed on the surface of the primary particle. Therefore, the amount of residual water is previously determined by a preliminary test or the like, and the amount of tungsten to be added to the slurry can be adjusted.

(C-2) Addition to Calcined Powder after Washing with Water and Before Drying

The tungsten (W) can be added to the calcined powder after washing with water and before drying. In this case, the tungsten can be added in the form of the alkali solution (W) which is used when the alkali solution (W) is added to the slurry during washing with water, or in the form of a tungsten compound.

When tungsten is added to the calcined powder in the form of the alkali solution (W), it is preferred that a pH of the alkali solution (W) is adjusted to 9 to 12 at a liquid temperature of 25° C.

When the pH is lower than 9, the amount of lithium eluted from the calcined powder becomes excessively large, and there is a possibility that battery characteristics are lowered. In addition, when the pH exceeds 12, the amount of excess alkali remaining on the composite oxide particle is excessively large, and there is a possibility that battery characteristics are lowered.

It is preferred that the concentration of tungsten (W) in the alkali solution (W) which includes water remaining in the calcined powder after solid-liquid separation is 0.05 moles/L to 2 moles/L.

When the concentration of tungsten in the alkali solution (W) is lower than 0.05 moles/L, that is, the concentration of tungsten is low, a large amount of the alkali solution (W) is necessitated. Therefore, when the alkali solution (W) is mixed with the calcined powder, the resulting mixture becomes slurry. When the mixture becomes slurry, since Li which is incorporated in the layer lattice of the calcined powder is eluted, and battery characteristics are lowered. Therefore, it is not preferred that the concentration of tungsten in the alkali solution (W) is lower than 0.05 moles/L. On the other hand, when the concentration of tungsten exceeds 2 moles/L, since the amount of the alkali solution (W) becomes less, tungsten cannot be sometimes uniformly dispersed on the surface of the primary particle.

In addition, it is preferred that the alkali solution (W) is an aqueous solution.

In order to disperse tungsten (W) on the entire surface of the primary particle, there is a necessity that tungsten (W) is impregnated into the space in the secondary particle and an incomplete grain boundary. When a solvent such as an alcohol having a high volatility is used in the alkali solution (W), since the solvent evaporates from the alkali solution (W) before the alkali solution (W) is impregnated into a space in the secondary particle, the alkali solution (W) sometimes is not sufficiently impregnated into the secondary particle.

On the other hand, when tungsten (W) is added in the form of a tungsten compound to the calcined powder being washed with water, the tungsten (W) can be dispersed on the surface of the primary particle by water remaining in the lithium-nickel composite oxide, and Li which is eluted from the calcined powder after solid-liquid separation.

In order to uniformly disperse tungsten (W) on the surface of the calcined powder, when the tungsten compound is mixed with the calcined powder, a conventional mixer can be used. The tungsten compound can be sufficiently mixed with the calcined powder to an extent that a framework of the lithium-nickel composite oxide is not destroyed by using a mixer such as a shaker mixer, a Lödige mixer, a Julia mixer or a V-blender. Thereby, tungsten (W) can be uniformly distributed on the surface of the primary particle of the lithium-nickel composite oxide in any case of the form of an alkali solution (W) and the form of a tungsten compound.

(C-3) Addition to Dried Calcined Powder after Washing with Water

The addition of tungsten after drying can be carried out in the same manner as in the addition by using the alkali solution (W) before drying. In this case, it is preferred that the concentration of tungsten in the alkali solution (W) is 0.05 moles/L to 2 moles/L, and it is preferred that the alkali solution (W) is added to the calcined powder after the solid-liquid separation at a temperature of 50° C. or lower. When the temperature exceeds 50° C., since the alkali solution (W) is promptly dried, there is a possibility that the alkali solution (W) cannot be sufficiently impregnated into the space of the secondary particle and the grain boundary.

In addition, when drying progresses rapidly, sufficient elution of Li from the calcined powder cannot be expected. In particular, when Li is not included in the alkali solution (W), Li is not sometimes included in the fine particle which is formed on the surface of primary particle.

When tungsten (W) is added to the calcined powder after drying, since the content of tungsten (W) due to solid-liquid separation is not so lowered, all of the tungsten (W) added are dispersed on and attached to the surface of the primary particle of the calcined powder. Therefore, the amount of tungsten (W) to be added can be an amount necessary for forming a fine particle on the surface of the primary particle.

In any of the above-mentioned methods for adding tungsten (W), the amount of tungsten (W) contained in the fine particle which is formed on the surface of the composite oxide particle is sometimes smaller than the amount of added tungsten (W) due to solid-liquid separation or pulverization after heat treatment which is described later. In this case, tungsten (W) can be added in view of an amount which will be reduced. The reduced amount of tungsten (W) can be easily determined by a preliminary test and the like. When conditions for adding are controlled to be constant, the amount of tungsten (W) being added can be stabilized.

(D) Step for Heat Treatment

A step for heat treatment is a step for heat-treating the lithium-nickel composite oxide in which tungsten (W) is dispersed on the surface of the primary particle, to form a fine particle containing W and Li on the surface of the primary particle of the lithium-nickel composite oxide. Thereby, a fine particle containing W and Li is formed from W and Li which are supplied from the step for adding tungsten, and thus a positive electrode active material for a non-aqueous electrolyte secondary battery having a fine particle containing W and Li on the surface of the primary particle of the lithium-nickel composite oxide is obtained. Incidentally, when tungsten (W) is added to the slurry during washing with water, or the calcined powder after washing with water and before drying, the drying can be replaced with the step for a heat treatment.

A method for carrying out the heating treatment of the lithium-nickel composite oxide is not particularly limited. It is preferred that the heat treatment is carried out at a temperature of 100° C. to 600° C. in an oxygen atmosphere or an atmosphere having a reduced pressure in order to avoid lowering of electrical characteristics when the lithium-nickel composite oxide is used as the positive electrode active material for a non-aqueous electrolyte secondary battery.

When the heating temperature is lower than 100° C., evaporation of moisture becomes insufficient, and a fine particle is not sometimes sufficiently formed. On the other hand, when the heating temperature exceeds 600° C., charge-discharge capacity of a battery is sometimes lowered, since the primary particle of the lithium-nickel composite oxide is sintered, and a part of tungsten (W) forms solid solution of a layered structure of the lithium-nickel composite oxide.

In order to suppress the lowering of charge-discharge capacity of a battery, the heating temperature is more preferably 550° C. or lower, and furthermore preferably 500° C. or lower.

It is preferred that the atmosphere where the heat treatment is carried out is an oxidizing atmosphere such as an oxygen atmosphere or an atmosphere having a reduced pressure in order to avoid a reaction of the lithium-nickel composite oxide with moisture or carbon dioxide contained in the atmosphere.

The period of time for carrying out the heat treatment is not particularly limited. It is preferred that the period of time is 5 hours to 15 hours in order to sufficiently evaporate moisture contained in the lithium-nickel composite oxide particle to form a fine particle.

The content of moisture in the lithium-nickel composite oxide particle after drying is not particularly limited. The content of moisture is preferably 0.2% by mass or less, and more preferably 0.1% by mass or less.

When the content of moisture in the lithium-nickel composite oxide particle exceeds 0.2% by mass, the lithium-nickel composite oxide particle sometimes absorbs a gaseous component including carbon and sulfur existing in the air, to generate a lithium compound on the surface of the particle. Incidentally, the content of moisture is a value determined by using a Karl-Fischer moisture meter at a vaporizing temperature of 300° C.

When aggregation of the lithium-nickel composite oxide particles is generated after the heat treatment, the aggregated lithium-nickel composite oxide particles are pulverized so that the form of the secondary particle is not destroyed, to give a positive electrode active material made of the lithium-nickel composite oxide particle having an average particle diameter of 8 μm to 20 μm.

(3) Non-Aqueous Electrolyte Secondary Battery

The non-aqueous electrolyte secondary battery of the present invention is produced by using a positive electrode which is produced by using the positive electrode active material including the lithium-nickel composite oxide as described above, particularly the positive electrode active material including the lithium-nickel composite oxide which is prepared by the above-mentioned process. The non-aqueous electrolyte secondary battery has a high capacity, high output and high safety.

The structure of the non-aqueous electrolyte secondary battery of the present invention is explained below.

The non-aqueous electrolyte secondary battery of the present invention (hereinafter simply referred to as secondary battery) has substantially the same structure as a standard non-aqueous electrolyte secondary battery, except that the positive electrode active material for a non-aqueous electrolyte secondary battery of the present invention (hereinafter simply referred to as positive electrode active material) is used as a material of the positive electrode.

More specifically, the secondary battery of the present invention has a structure containing a case, and a positive electrode, a negative electrode, a non-aqueous electrolyte solution and a separator, which are accommodated in the case.

Furthermore specifically, the secondary battery of the present invention is formed by laminating a positive electrode and a negative electrode through a separator to give an electrode body, immersing the obtained electrode body in a non-aqueous electrolyte solution, connecting a positive electrode current collector of a positive electrode and a negative electrode current collector of a negative electrode with a positive terminal for leading to outside and a negative terminal for leading to outside, respectively, through a lead for connecting an electrode with a terminal, accommodating them in a case, and sealing the case.

In addition, the structure of the secondary battery of the present invention is not limited only to the above-mentioned exemplified one, and various kinds of outer shapes such as a cylindrical shape and a laminated shape can be employed.

(Positive Electrode)

The positive electrode which is one of the characteristics of the secondary battery of the present invention is firstly described.

The positive electrode is a sheet-like material. The positive electrode can be formed by, for example, coating a positive electrode mixture containing the positive electrode active material of the present invention on the surface of a current collector made of an aluminum foil, and drying the positive electrode mixture. However, the process for producing the positive electrode is not particularly limited. The positive electrode can be also produced by, for example, supporting a positive electrode mixture containing particles of a positive electrode active material and a binder on a belt-like positive electrode core member (positive electrode current collector).

In addition, the positive electrode is appropriately treated so as to fit a battery to be used. For example, there can be conducted to the positive electrode a treatment such as a treatment for cutting so as to have a suitable size corresponding to an objective battery, or a treatment for compressing by means of a roll press and the like in order to increase an electrode density.

(Positive Electrode Mixture)

The positive electrode mixture can be prepared by mixing the positive electrode active material of the present invention in the form of powder with an electric conductive material and a binder to give a positive electrode agent, adding a solvent to the positive electrode agent, and kneading the resulting mixture.

Hereinafter, materials other than the positive electrode active material, which are used in the positive electrode mixture, are described.

[Binder]

As a binder for the positive electrode mixture, any of a thermoplastic resin and a thermosetting resin can be used, and the thermoplastic resin is preferred.

The thermoplastic resin includes, for example, polyethylene, polypropylene, polytetrafluoroethylene (PTFE), polyvinylidene fluoride (PVDF), styrene-butadiene rubber, tetrafluoroethylene-hexafluoropropylene copolymer (FEP), tetrafluoroethylene-perfluoroalkyl vinyl ether copolymer (PFA), vinylidene fluoride-hexafluoropropylene copolymer, vinylidene fluoride-chlorotrifluoroethylene copolymer, ethylene-tetrafluoroethylene copolymer (ETFE), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, vinylidene fluoride-perfluoromethylvinyl ether-tetrafluoroethylene copolymer, ethylene-acrylic acid copolymer, ethylene-methacrylic acid copolymer, ethylene-methyl acrylate copolymer, ethylene-methyl methacrylate copolymer, and the like.

The resins can be used alone, or at least two kinds thereof can be used in combination. In addition, each of these resins can be a crosslinked resin being crosslinked by $Na^+$ ion and the like.

[Electric Conductive Material]

An electric conductive material used in the positive electrode mixture can be an electric conductive material which is chemically stable in a battery, and the electric conductive material is not particularly limited. The electric conductive material includes, for example, graphite such as natural graphite (flake graphite and the like) or artificial graphite; carbon black such as acetylene black, Ketjen black, channel black, furnace black, lamp black or thermal black; electric conductive fibers such as carbon fiber and metal fiber; metal powder such as aluminum powder; electric conductive whisker such as zinc oxide whisker or potassium titanate whisker; electric conductive metal oxide such as titanium oxide; organic electric conductive materials such as polyphenylene derivatives; fluorocarbon, and the like. These electric conductive materials can be used alone, or at least two kinds thereof can be used in combination.

Incidentally, the amount of the electric conductive material which is added to the positive electrode mixture is not particularly limited, and the amount is preferably 0.5 to 50% by mass, more preferably 0.5 to 30% by mass, furthermore preferably 0.5 to 15% by mass to the particles of a positive-electrode active material contained in the positive electrode mixture.

[Solvent]

A solvent is used to dissolve a binder and to disperse a positive electrode active material, an electric conductive material and the like in the binder. This solvent is not particularly limited, and there can be used, for example, an organic solvent such as N-methyl-2-pyrrolidone.

[Positive Electrode Core Material]

A positive electrode core material (positive electrode collector) can be an electronic conductor which is chemically stable in a battery, and is not particularly limited. The positive electrode core material includes, for example, a foil and a sheet made of a material such as aluminum, stainless steel, nickel, titanium, carbon or an electric conductive resin. Among them, an aluminum foil, an aluminum alloy foil and the like are preferred.

In addition, a carbon layer or a titanium layer can be formed on the surface of a foil or a sheet, and an oxide layer can be formed on the surface of a foil or a sheet. Furthermore, a convex and concave form can be formed on the surface of a foil or a sheet. In addition, a net, a punching sheet, a lath, a porous material, a foamed material, a fibrous molded article and the like also can be provided on the surface of a foil or a sheet.

The thickness of the positive electrode core material is not particularly limited, and it is preferred that the thickness is, for example, 1 to 500 μm.

[Materials Other than Positive Electrode]

Next, the materials other than a positive electrode, which are used in the non-aqueous electrolyte secondary battery of the present invention, are described.

Incidentally, the non-aqueous electrolyte secondary battery of the present invention is characterized in that the above-mentioned positive electrode active material is used. The materials other than the positive electrode can be suitably selected according to the use and required characteristics, and are not limited to the materials other than the positive electrode as described below.

[Negative Electrode]

A negative electrode can be one which enables to charge and discharge lithium, and the negative electrode is not particularly limited.

As the negative electrode, there can be used a negative electrode in which a negative electrode mixture containing a negative electrode active material and a binder, and an electric conductive material and a thickener as optional components, is supported on a negative electrode core material. The negative electrode can be produced in the same manner as in the positive electrode.

The negative electrode active material can be one which enables to electrochemically charge and discharge lithium. The negative electrode active material includes, for example, graphite, nongraphitizing carbon, lithium alloy, and the like.

This lithium alloy is not particularly limited, and it is preferred that the lithium alloy contains at least one element selected from the group consisting of silicon, tin, aluminum, zinc and magnesium.

In addition, the average particle diameter of the negative electrode active material is not particularly limited, and it is preferred that the average particle diameter is, for example, 1 to 30 μm.

[Binder]

A binder used in the negative electrode mixture can be any of a thermoplastic resin and a thermosetting resin. Among the resins, thermoplastic resin is preferred.

The thermoplastic resin is not particularly limited. The thermoplastic resin includes, for example, polyethylene, polypropylene, polytetrafluoroethylene (PTFE), polyvinylidene fluoride (PVDF), styrene-butadiene rubber, tetrafluoroethylene-hexafluoropropylene copolymer (FEP), tetrafluoroethylene-perfluoroalkyl vinyl ether copolymer (PFA), vinylidene fluoride-hexafluoropropylene copolymer, vinylidene fluoride-chlorotrifluoroethylene copolymer, ethylene-tetrafluoroethylene copolymer (ETFE), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, vinylidene fluoride-perfluoromethyl vinyl ether-tetrafluoroethylene copolymer, ethylene-acrylic acid copolymer, ethylene-methacrylic acid copolymer, ethylene-methyl acrylate copolymer, ethylene-methyl methacrylate copolymer, and the like.

These resins can be used alone, or at least two kinds thereof can be used in combination. In addition, each of these resins can be a crosslinked resin being crosslinked by $Na^+$ ion and the like.

[Electric Conductive Material]

The electric conductive material of a negative electrode mixture can be an electric conductive material which is chemically stable in a battery, and the electric conductive material is not particularly limited. The electric conductive material includes, for example, graphite such as natural graphite (flake graphite and the like) or artificial graphite; carbon black such as acetylene black, Ketjen black, channel black, furnace black, lamp black or thermal black; electric conductive fibers such as a carbon fiber and a metal fiber; metal powder such as copper powder or nickel powder; organic electric conductive materials such as polyphenylene derivatives, and the like. These electric conductive materials can be used alone, or at least two kinds thereof can be used in combination.

The amount of this electric conductive material to be added is not particularly limited. The amount of the electric conductive material is preferably 1 to 30% by mass, more preferably 1 to 10% by mass to the particles of a negative electrode active material contained in the negative electrode material mixture.

[Negative Electrode Core Material]

A negative electrode core material (negative electrode collector) can be an electronic conductor which is chemically stable in a battery, and is not particularly limited. The negative electrode core material includes, for example, a foil and a sheet made of a material such as stainless steel, nickel, copper, titanium, carbon or an electric conductive resin, and copper and copper alloy are preferred.

A layer such as a carbon layer, a titanium layer or a nickel layer can be formed on the surface of the foil or the sheet, and an oxide layer can be formed on the surface of the foil or the sheet. Moreover, a convex and concave form can be formed on the surface of the foil or the sheet. Furthermore, a net, a punching sheet, a lath, a porous material, a foamed material, a fibrous molded article and the like can be provided on the surface of the foil or the sheet.

The thickness of the negative electrode core material is also not particularly limited, and it is preferred that the thickness is, for example, 1 to 500 μm.

[Non-Aqueous Electrolyte Solution]

It is preferred that the non-aqueous electrolyte solution is a solution in which a lithium salt is dissolved in a non-aqueous solvent.

The non-aqueous solvent used in the non-aqueous electrolyte solution is not particularly limited. The non-aqueous solvent includes, for example, cyclic carbonates such as ethylene carbonate (EC), propylene carbonate (PC), butylene carbonate (BC) and vinylene carbonate (VC); chain carbonates such as dimethyl carbonate (DMC), diethyl carbonate (DEC), ethylmethyl carbonate (EMC) and dipropyl carbonate (DPC); aliphatic carboxylates such as methyl formate, methyl acetate, methyl propionate and ethyl propionate; lactones such as gamma-butyrolactone and gamma-valerolactone; chain ethers such as 1,2-dimethoxyethane (DME), 1,2-diethoxyethane (DEE) and ethoxymethoxy ethane (EME); cyclic ethers such as tetrahydrofuran and 2-methyltetrahydrofuran; dimethyl sulfoxide, 1,3-dioxolane, formamide, acetamide, dimethylformamide, dioxolane, acetonitrile, propyl nitrile, nitromethane, ethyl monoglyme, phosphoric acid triester, trimethoxymethane, dioxolane derivatives, sulfolane, methyl sulfolane, 1,3-dimethyl-2-imidazolidinone, 3-methyl-2-oxazolidinone, propylene carbonate derivatives, tetrahydrofuran derivatives, ethyl ethers, 1,3-propanesultone, anisole, dimethyl sulfoxide, N-methyl-2-pyrrolidone, and the like. These solvents can be used alone, or at least two kinds thereof can be used in combination.

In particular, a mixed solvent of the cyclic carbonate and the chain carbonate, and a mixed solvent of the cyclic carbonate, the chain carbonate and the aliphatic carboxylate are preferred.

[Lithium Salt]

The lithium salt being dissolved in the non-aqueous electrolyte solution includes, for example, $LiClO_4$, $LiBF_4$, $LiPF_6$, $LiAlCl_4$, $LiSbF_6$, LiSCN, LiCl, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lithium lower aliphatic carboxylate, LiCl, LiBr, LiI, chloroborane lithium, lithium tetraphenylborate, lithium imide, and the like. These lithium salts can be used alone, or at least two kinds thereof can be used in combination. Incidentally, it is preferred that at least $LiPF_6$ is used as the lithium salt.

In addition, the concentration of the lithium salt in the non-aqueous solvent is not particularly limited, and it is preferred that the concentration is 0.2 to 2 moles/L, more preferably 0.5 to 1.5 moles/L.

[Other Additive]

To the non-aqueous electrolyte solution, various additives other than the lithium salt can be added in order to improve charge-discharge characteristics of a battery.

The additives are not particularly limited. The additives include, for example, triethyl phosphite, triethanolamine, cyclic ethers, ethylenediamine, n-glyme, pyridine, hexaphosphoric acid triamide, nitrobenzene derivatives, crown ethers, quaternary ammonium salts, ethylene glycol dialkyl ethers, and the like.

[Separator]

A fine separator is intervened between a positive electrode and a negative electrode.

This separator is not particularly limited, and it is preferred that the separator is a microporous thin film having a high ion permeability, a predetermined mechanical strength and an electric insulation. In particular, it is preferred that the microporous thin film has properties such that holes of the thin film are closed at a predetermined temperature, and that the thin film has a function for increasing an electric resistance.

The material used in the microporous thin film is not particularly limited, and there can be used, for example, a polyolefin which is excellent in organic solvent resistance and has hydrophobicity, such as polypropylene or polyethylene. In addition, a sheet made of a glass fiber and the like, non-woven fabric, woven fabric and the like can be also used.

When the separator is a microporous thin film, the diameter of a pore formed in the thin film is not particularly limited, and it preferred that the diameter of the pore is, for example, 0.01 to 1 µm. The porosity of the separator is not also particularly limited, and it is preferred that the porosity is generally 30 to 80%. In addition, the thickness of the separator is not also particularly limited, and it is preferred that the thickness is generally 10 to 300 µm.

Furthermore, the separators used in the positive electrode and the negative electrode can be different from each other. The polymer electrolyte which includes a non-aqueous electrolyte solution and a polymer substrate for retaining the non-aqueous electrolyte solution can be used as a separator by unifying into one body with a positive electrode or a negative electrode.

This polymer substrate is not particularly limited, as long as the polymer substrate can retain a non-aqueous electrolyte solution. It is preferred that the polymer used in the polymer substrate is a copolymer of vinylidene fluoride and hexafluoropropylene.

EXAMPLES

The present invention is more specifically described by the following working examples of the present invention and comparative examples, but the present invention is not limited only to those working examples.

Incidentally, in the working examples and the comparative examples, in accordance with the following methods, metals included in the lithium-nickel composite oxide were analyzed, and the length of c-axis was measured.

(1) Analysis of metals: determined by ICP emission spectrometry.

(2) Measurement of length of c-axis: measured by using a XRD diffractometer manufactured by PANalytical B. V. under the item number of X 'Pert PRO.

(Process for Producing Secondary Battery for Evaluating Battery Performance)

When battery performance of a non-aqueous electrolyte secondary battery, in which the lithium-nickel composite oxide according to the present invention was used as a positive electrode active material, was evaluated, a 2032 coin type battery as shown in FIG. 1 (hereinafter referred to as coin type battery 1) was used.

As shown in FIG. 1, the coin type battery 1 is composed of a case 2 and an electrode 3 which is accommodated in the case 2.

The case 2 has a positive electrode can 2*a* which is hollow and has an opening at one end, and a negative electrode can 2*b* which is arranged at the opening of the positive electrode can 2*a*. When the negative electrode can 2*b* is placed on the opening of the positive electrode can 2*a*, a space for accommodating an electrode 3 is formed between the negative electrode can 2*b* and the positive electrode can 2*a*.

The electrode 3 includes a positive electrode (electrode for evaluation) 3*a*, a separator 3*c* and a negative electrode (lithium metal negative electrode) 3*b*, and these constituents are laminated in this order. The positive electrode 3*a* and the negative electrode 3*b* are accommodated in the case 2 so that the positive electrode 3*a* is contacted with the inner surface of the positive electrode can 2*a*, and that the negative electrode 3*b* is contacted with the inner surface of the negative electrode can 2*b*.

Incidentally, the case 2 is equipped with a gasket 2*c*. The positive electrode can 2*a* and the negative electrode 2*b* are maintained so that the positive electrode can 2*a* is not contacted with the negative electrode 2*b* through the gasket 2*c*, and that a relative movement of the positive electrode can 2*a* and the negative electrode 2*b* are fixed by the gasket $2c$. Also, since the gasket $2c$ seals the space between the positive electrode can $2a$ and the negative electrode $2b$, the gasket $2c$ has a function for airtightly and liquid-tightly blocking the space between the inside of the case 2 and its outside.

The above-mentioned coin type battery 1 was produced in accordance with the following method:

At first, 5 parts by weight of acetylene black and 5 parts by weight of polyvinylidene fluoride were mixed with 90 parts by weight of a powder of a positive electrode active material, and n-methyl pyrrolidone is added to the resulting mixture, to give a paste.

An aluminum foil having a thickness of 20 µm was coated with this prepared paste, so that the amount of the positive electrode active material after drying was 0.05 g/cm$^2$.

Thereafter, the aluminum foil which was coated with the paste was dried at 120° C. under reduced pressure, and then the aluminum foil was punched into a disc having a diameter of 1 cm, to give a positive electrode $3a$.

The above-mentioned coin type battery 1 was produced by using this positive electrode $3a$, the negative electrode $3b$, the separator $3c$ and an electrolyte solution in a glove box having argon gas atmosphere of which dew point was controlled to −80° C.

Incidentally, as the negative electrode $3b$, a discoidal plate made of lithium metal having a diameter of 15 mm was used.

As the separator $3c$, a porous polyethylene film having a thickness of 20 µm was used.

As the electrolyte solution, a mixed solution of ethylene carbonate (EC) and diethyl carbonate (DEC) being mixed in an equal ratio, containing 1 M of LiClO$_4$ as a supporting electrolyte (manufactured by Ube Industries, Ltd.) was used.

The battery characteristics of the coin type battery produced by the above-mentioned method were evaluated.

As the battery characteristics, initial electric discharge capacity and positive electrode reaction resistance were determined.

The initial discharge capacity was determined by the following method:

At first, a coin type battery 1 was produced, and the coin type battery 1 was allowed to stand for about 24 hours. After the open circuit voltage OCV (Open Circuit Voltage) of the coin type battery 1 was stabilized, the positive electrode of the coin type battery 1 was charged up to a cutoff voltage of 4.3 V at a current density of 0.1 mA/cm$^2$. After 1 hour pauses, the coin type battery 1 was discharged to a cutoff voltage of 3.0 V. The coin type battery 1 was discharged to a cutoff voltage of 3.0 V, and the capacity of the coin type battery 1 at this point was regarded as an initial discharge capacity.

Next, the positive electrode reaction resistance was calculated by the following method:

First of all, the coin type battery obtained in each Example was charged to a charging voltage of 4.1 V. An AC impedance of the coin type battery was determined by an AC impedance method with a frequency response analyzer and a potentiogalvanostat (manufactured by Solartron ISA under the item number of 1255B). The relation between the circuit used in the determination and the frequency is shown in a graph. As a result, a Nyquist plot was obtained as shown in FIG. 2.

This Nyquist plot showed a sum of characteristic curves indicating a solution resistance, a negative electrode resistance and its capacity, and electric resistance of a positive electrode and its capacity. Therefore, a fitting calculation was carried out by using an equivalent circuit based on the Nyquist plot, to obtain a value of the positive electrode reaction resistance.

Example 1

First of all, a temperature inside a reactor was controlled to 49.5° C. While a reaction solution in the reactor was maintained to pH 13.0 by using a 20% by mass aqueous solution of sodium hydroxide at a liquid temperature of 25° C., a mixed aqueous solution of nickel sulfate and cobalt sulfate, an aqueous solution of sodium aluminate, and 25% by mass aqueous ammonia were added to the reaction solution. The resulting mixture was collected by overflowing. Furthermore, the reaction mixture was washed with a 45 g/L aqueous solution of sodium hydroxide having a pH of 12.5 at a liquid temperature of 25° C., and then the reaction mixture was washed with water and dried, to give a nickel composite hydroxide (neutralization crystallization method).

This nickel composite hydroxide was composed of secondary particles in which plural primary particles having a size of 1 µm or less were aggregated to form a spherical particle. The nickel composite hydroxide was analyzed by an ICP method. As a result, it was confirmed that the nickel composite hydroxide was a nickel composite hydroxide in which the molar ratio of Ni:Co:Al was 94:3:3.

The average particle diameter on the basis of volume MV of this nickel composite hydroxide was 13 µm as determined by a laser diffraction scattering method.

In addition, the quantitative analysis of sulfur was carried out by an ICP emission spectrometry, and the content of sulfate radical was determined by regarding that sulfur is completely oxidized to sulfate radical (SO$_4$). As a result, the content of the sulfate radical was 0.28% by mass. The content of the sulfate radical in the nickel composite hydroxide is shown in Table 1.

Next, this nickel composite hydroxide was oxidized and calcined at 600° C. in the air, to give nickel composite oxide. Thereafter, the nickel composite hydroxide and lithium hydroxide monohydrate were weighed, and the nickel composite hydroxide was mixed with the lithium hydroxide monohydrate so that the molar ratio of Ni:Co:Al:Li was 0.94:0.03:0.03:1.025, to give a lithium-containing mixture.

The resulting lithium-containing mixture was provisionally calcined at 500° C. for 3 hours in an oxygen-containing atmosphere by using an electric furnace, then the mixture was maintained at 745° C. for 3 hours, and calcining was carried out by controlling the period of time from the initiation of increasing the temperature to the end of maintaining the temperature to 20 hours. Thereafter, the mixture was cooled to room temperature in the electric furnace, and pulverized to give a calcined powder in which a tungsten compound was included (hereinafter, referred to as base material).

The base material thus obtained was analyzed by an ICP method. As a result, it was confirmed that the molar ratio of Ni:Co:Al:Li was 0.94:0.03:0.03:1.024.

Next, pure water of 20° C. was added to the base material thus obtained, to give slurry containing 750 g of the base material based on 1 L of water. This slurry was stirred for 20 minutes, and then passed through a filter press and dehydrated to give a base material cake.

The addition of tungsten to this base material was carried out by passing an alkali solution (W) including a tungsten compound through the base material cake which had been dehydrated in the filter press, dehydrating again the base material, and dispersing the tungsten (W) on the surface of the primary particle of the base material.

Incidentally, the amount of the tungsten compound added is determined by the concentration of tungsten in the alkali solution (W) which is passed through, and the moisture content of the base material cake after dehydration. In other words, the amount of tungsten contained in the moisture after dehydration is to be an added amount.

In this working example, an alkali solution (W) having a concentration of tungsten of 0.58 moles/L, which was prepared by adding 131.8 g of tungsten oxide ($WO_3$) to an aqueous solution prepared by dissolving 50.6 g of lithium hydroxide ($LiOH.H_2O$) in 1 L of pure water, was used.

The content of moisture in the base material cake after dehydration was 6.1%.

The lithium-nickel composite oxide wetted with the alkali solution (W) thus obtained was allowed to stand and dried for 10 hours by using a vacuum dryer heated to 190° C.

Finally, the lithium-nickel composite oxide was pulverized by passing through a sieve having an opening of 38 μm, to give a positive electrode active material having a fine particle containing W and Li on the surface of primary particle.

The composition of the positive electrode active material thus obtained was analyzed by an ICP method. As a result, it was confirmed that the molar ratio of Ni:Co:Al:Li was 0.94:0.03:0.03:0.99 and that the content of tungsten was 0.35 atom % based on the sum of the numbers of Ni, Co and Al atoms.

In addition, the specific surface area of the obtained positive electrode active material was 0.93 $m^2/g$ as determined by a BET method.

This positive electrode active material was embedded in a resin, and cross-section polisher processing of the resin was carried out. The cross-section of the resin was observed with a SEM at a magnification of 5000 times. As a result, it was confirmed from the result of an X-ray diffraction analysis that the positive electrode active material composed of primary particles and secondary particles composed of an aggregate of the primary particles, and lithium tungstate was formed on the surface of the primary particle in the form of an island or in the form of a layer. In addition, the porosity of the secondary particle was 2.1% as determined by this observation.

[Evaluation of Battery]

The battery characteristics of the positive electrode active material thus obtained were evaluated. Incidentally, the positive electrode resistance was a relative value when the value of the positive electrode resistance obtained in Example 1 was regarded as 1.00.

In the following Examples 2 to 7 and Comparative Examples 1 to 4, only the materials and conditions which are changed from the above Example 1 are described. In addition, the discharge capacity and the evaluation of the positive electrode resistance of the positive electrode active material obtained in Examples 1 to 7 and Comparative Examples 1 to 4 are shown in Table 1.

Example 2

A positive electrode active material was produced in the same manner as in Example 1, except that the moisture content of a cake obtained after passing the alkali solution (W) and dehydrating the cake was changed to 12.0%, and was evaluated. The results are shown in Table 1.

Example 3

A positive electrode active material was produced in the same manner as in Example 1, except that the nickel composite hydroxide was crystallized so that the molar ratio of Ni:Co:Al was 91:6:3, and was evaluated. The results are shown in Table 1.

Example 4

A positive electrode active material was produced in the same manner as in Example 1, except that the nickel composite hydroxide was crystallized so that the molar ratio of Ni:Co:Al was 88:9:3 and that the calcination temperature was changed from 745° C. to 760° C., and was evaluated. The results are shown in Table 1.

Example 5

A positive electrode active material was produced in the same manner as in Example 1, except that the nickel composite hydroxide was crystallized so that the molar ratio of Ni:Co:Al was 91:6:3 and that the aqueous solution of sodium hydroxide used in washing after collection by overflowing was changed to a 10 g/L aqueous solution of sodium carbonate having a pH of 11.0 at a liquid temperature of 25° C., and was evaluated. The results are shown in Table 1.

Example 6

A positive electrode active material was produced in the same manner as in Example 1, except that the nickel composite hydroxide was crystallized so that the molar ratio of Ni:Co:Al was 88:9:3 and that the aqueous solution of sodium hydroxide used in washing after collection by overflowing was changed to a 65 g/L aqueous solution of sodium hydroxide having a pH of 13.5 at a liquid temperature of 25° C., and was evaluated. The results are shown in Table 1.

Example 7

A positive electrode active material was produced in the same manner as in Example 1, except that the aqueous solution of sodium hydroxide used in washing after collection by overflowing was changed to a 10 g/L aqueous solution of sodium hydroxide having a pH of 10.5 at a liquid temperature of 25° C., and was evaluated. The results are shown in Table 1.

Comparative Example 1

A positive electrode active material was produced in the same manner as in Example 1, except that the nickel composite hydroxide was crystallized so that the molar ratio of Ni:Co:Al was 82:15:3 and that the calcination temperature was changed from 745° C. to 760° C., and was evaluated. The results are shown in Table 1.

Comparative Example 2

A positive electrode active material was produced in the same manner as in Example 1, except that the nickel composite hydroxide was crystallized so that the molar ratio of Ni:Co:Al was 91:6:3 and that an alkali solution (W) including a tungsten compound was not passed through the filter press, and was evaluated. The results are shown in Table 1.

Comparative Example 3

A positive electrode active material was produced in the same manner as in Example 1, except that an alkali solution (W) including a tungsten compound was not passed through the filter press, and was evaluated. The results are shown in Table 1.

Comparative Example 4

A positive electrode active material was produced in the same manner as in Example 1, except that the nickel composite hydroxide was crystallized so that the molar ratio of Ni:Co:Al was 88:9:3 and that the calcination temperature was changed from 745° C. to 790° C., and was evaluated. The results are shown in Table 1.

TABLE 1

|  | Composition [Ni:Co:Al molar ratio] | Sulfate radical content [wt %] | Calcination temperature [° C.] | Amount of W [mol %] | Li/M after washing with water | c-axis length [Å] | Specific surface area [m²/g] | Porosity [%] | Discharge capacity [mAh/g] | Positive electrode resistance |
|---|---|---|---|---|---|---|---|---|---|---|
| Ex. 1 | 94:3:3 | 0.28 | 745 | 0.35 | 0.99 | 14.199 | 0.93 | 9.1 | 221 | 1.00 |
| Ex. 2 | 94:3:3 | 0.28 | 745 | 0.71 | 0.99 | 14.199 | 0.75 | 0.8 | 217 | 1.03 |
| Ex. 3 | 91:6:3 | 0.26 | 745 | 0.37 | 0.99 | 14.195 | 0.95 | 2.2 | 215 | 1.08 |
| Ex. 4 | 88:9:3 | 0.26 | 760 | 0.35 | 0.98 | 14.191 | 0.96 | 2.2 | 213 | 1.08 |
| Ex. 5 | 91:6:3 | 0.12 | 745 | 0.34 | 0.99 | 14.193 | 0.45 | 0.5 | 214 | 1.03 |
| Ex. 6 | 88:9:3 | 0.06 | 745 | 0.33 | 0.99 | 14.183 | 0.32 | 0.3 | 211 | 1.14 |
| Ex. 7 | 94:3:3 | 0.51 | 745 | 0.37 | 0.99 | 14.205 | 1.24 | 5.3 | 212 | 1.15 |
| Comp. Ex. 1 | 82:15:3 | 0.27 | 760 | 0.36 | 0.99 | 14.183 | 0.97 | 2.8 | 201 | 1.17 |
| Comp. Ex. 2 | 91:6:3 | 0.26 | 745 | — | 0.99 | 14.195 | 1.05 | 3.3 | 210 | 1.89 |
| Comp. Ex. 3 | 94:3:3 | 0.28 | 745 | — | 0.98 | 14.199 | 1.08 | 3.5 | 211 | 1.61 |
| Comp. Ex. 4 | 88:9:3 | 0.26 | 790 | 0.34 | 0.98 | 14.182 | 0.31 | 0.1 | 199 | 1.28 |

[Evaluation]

As is clear from Table 1, since the positive electrode active materials obtained in Examples 1 to 7 were produced in accordance with the present invention, the positive electrode active materials exhibit higher discharge capacity and lower positive electrode resistance in comparison with Comparative Examples 1 to 4, and provide a positive electrode active material for non-aqueous electrolyte secondary batteries having high capacity and high output.

INDUSTRIAL APPLICABILITY

The non-aqueous electrolyte secondary battery of the present invention has high capacity and high safety. Therefore, the non-aqueous electrolyte secondary battery of the present invention can be particularly suitably used as a secondary battery capable of charging and discharging, which can be used in small electronics such as a notebook-sized personal computer and a mobile telephone.

EXPLANATION OF REFERENTIAL NUMBERS

1 Coin type battery
2 Case
2a Positive electrode can
2b Negative electrode can
2c Gasket
3 Electrode
3a Positive electrode
3b Negative electrode
3c Separator

The invention claimed is:

1. A positive electrode active material for a non-aqueous electrolyte secondary battery, comprising a primary particle of a lithium-nickel composite oxide represented by the following general formula (1), and a secondary particle comprising an aggregate of the primary particles, wherein the primary particle has a fine particle containing W and Li on its surface, and the length of c-axis of the crystal of the lithium-nickel composite oxide is 14.183 angstrom or more as determined by a Rietveld analysis of X-ray diffraction, (Chem. 1)

$$\text{General formula: } Li_bNi_{1-x-y}Co_xM_yO_2 \quad (1)$$

wherein M is at least one element selected from Mg, Al, Ca, Ti, V, Cr, Nb, Zr and Mo, b is a numeral satisfying $0.95 \leq b \leq 1.03$, x is a numeral satisfying $0 < x \leq 0.15$, y is a numeral satisfying $0 < y \leq 0.07$, and the sum of x+y is a numeral satisfying $x+y \leq 0.16$.

2. The positive electrode active material for a non-aqueous electrolyte secondary battery according to claim 1, wherein the porosity of the secondary particle in which the fine particle containing tungsten and lithium is incorporated in a space is 0.5% to 4% as determined by observing the cross-section of the secondary particle.

3. The positive electrode active material for a non-aqueous electrolyte secondary battery according to claim 1, wherein the number of tungsten atom included in the fine particle containing W and Li is 0.1 atom % to 3.0 atom % based on the sum of the numbers of Ni, Co and M atoms included in the lithium-nickel composite oxide of the primary particle.

4. The positive electrode active material for a non-aqueous electrolyte secondary battery according to claim 2, wherein the positive electrode active material is represented by the following general formula (2):
(Chem. 2 )

$$\text{General formula: } Li_bNi_{1-x-y}Co_xM_yW_zO_{2+\alpha} \quad (2)$$

wherein M is at least one element selected from Mg, Al, Ca, Ti, V, Cr, Mn, Nb, Zr and Mo, b is a numeral satisfying $0.95 < b \leq 1.10$, x is a numeral satisfying $0 < x \leq 0.15$, y is a numeral satisfying $0 < y \leq 0.07$, the sum of x+y is a numeral satisfying $x+y \leq 0.16$, z is a numeral satisfying $0.001 \leq z \leq 0.03$, and $\alpha$ is a numeral satisfying $0 \leq \alpha \leq 0.2$.

5. The positive electrode active material for a non-aqueous electrolyte secondary battery according to claim 1, wherein W and Li contained in the fine particle exist in the form of lithium tungstate.

6. The positive electrode active material for a non-aqueous electrolyte secondary battery according to claim 1, wherein the lithium-nickel composite oxide has an average particle diameter of 8 μm to 20 μm.

7. A method for producing a positive electrode active material for a non-aqueous electrolyte secondary battery formed from a lithium-nickel composite oxide, comprising the following steps (A) to (D) in the order of the steps (A) to (D):
- (A) a step for mixing a nickel compound containing nickel, cobalt and at least one member selected from Mg, Al, Ca, Ti, V, Cr, Mn, Nb, Zr and Mo with a lithium compound, and calcining the resulting mixture at a temperature of 700 °C. to 780° C. in an oxidizing atmosphere, to prepare a calcined powder of the lithium-nickel composite oxide represented by the following general formula (3), comprising a primary particle and a secondary particle comprising an aggregate of the primary particles, in which the length of the c-axis of the crystal of the lithium-nickel composite oxide is 14.183 angstrom or more as determined by a Rietveld analysis of X-ray diffraction, (Chem. 3)

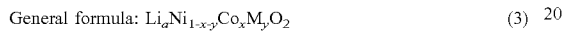

General formula: $Li_aNi_{1-x-y}Co_xM_yO_2$ (3)

wherein M is at least one element selected from Mg, Al, Ca, Ti, V, Cr, Mn, Nb, Zr and Mo, a is a numeral satisfying $0.98 \leq a \leq 1.11$, x is a numeral satisfying $0 < x \leq 0.15$, y is a numeral satisfying $0 < y \leq 0.07$, and the sum of x+y is a numeral satisfying $x+y \leq 0.16$;
- (B) a step for mixing the calcined powder of the lithium-nickel composite oxide prepared in the step (A) with water so that the amount of the calcined powder of the lithium-nickel composite oxide is 700 g to 2000 g based on 1 liter of water, to form slurry, and washing the calcined powder of the lithium-nickel composite oxide in the form of the slurry with water;
- (C) a step for adding a tungsten compound to the calcined powder of the lithium-nickel composite oxide during washing with water in the step (B) or after washing with water, and dispersing W on the surface of the primary particle of the calcined powder of the lithium-nickel composite oxide; and
- (D) a step for heat-treating the calcined powder produced in the step (C) in which W is dispersed on the surface of the primary particle, to form a fine particle containing W and Li on the surface of the primary particle of the calcined powder of the lithium-nickel composite oxide.

8. The method for producing a positive electrode active material for a non-aqueous electrolyte secondary battery according to claim 7, wherein the amount of tungsten dispersed on the surface of the primary particle of the lithium-nickel composite oxide is controlled to 0.1 atom % to 3.0 atom % based on the sum of the numbers of Ni, Co and M atoms which are included in the lithium-nickel composite oxide.

9. The method for producing a positive electrode active material for a non-aqueous electrolyte secondary battery according to claim 7, wherein the heat treatment in the step (D) is carried out at 100° C. to 600° C. in an oxygen atmosphere or an atmosphere having a reduced pressure.

10. The method for producing a positive electrode active material for a non-aqueous electrolyte secondary battery according to claim 7, wherein the nickel compound is any one of a nickel composite hydroxide, a nickel composite oxyhydroxide obtained by oxidizing the nickel composite hydroxide with an oxidizing agent, a nickel composite oxide obtained by oxidizing and calcining the nickel composite oxyhydroxide at a temperature of 500° C. to 750° C., a nickel composite oxide obtained by oxidizing and calcining the nickel composite hydroxide at a temperature of 500° C. to 750° C., and a nickel composite oxide obtained by oxidizing and calcining a mixture of the nickel composite hydroxide and the nickel composite oxyhydroxide at a temperature of 500° C. to 750° C.

11. The method for producing a positive electrode active material for a non-aqueous electrolyte secondary battery according to claim 10, wherein the content of sulfate radical in the nickel composite hydroxide is 0.1% to 0.4% by mass.

12. The method for producing a positive electrode active material for a non-aqueous electrolyte secondary battery according to claim 7, wherein the lithium compound is at least one member selected from the group consisting of lithium hydroxide, lithium oxyhydroxide, lithium oxide, lithium carbonate, lithium nitrate and a lithium halide.

13. The method for producing a positive electrode active material for a non-aqueous electrolyte secondary battery according to claim 7, wherein in the step (A), the nickel compound is mixed with the lithium compound so that the molar ratio of lithium in the lithium compound to the total amount of all the metal elements in the nickel composite oxide is 0.98 to 1.11.

14. The method for producing a positive electrode active material for a non-aqueous electrolyte secondary battery according to claim 7, wherein in the step (B), the temperature of water at washing with water is controlled to 10° C. to 40° C.

15. A non-aqueous electrolyte secondary battery comprising a positive electrode which contains the positive electrode active material for a non-aqueous electrolyte secondary battery according to claim 1.

* * * * *